(12) United States Patent
Tekolste et al.

(10) Patent No.: US 10,073,267 B2
(45) Date of Patent: Sep. 11, 2018

(54) OUTCOUPLING GRATING FOR AUGMENTED REALITY SYSTEM

(71) Applicant: Magic Leap, Inc., Plantation, FL (US)

(72) Inventors: Robert D. Tekolste, Fort Lauderdale, FL (US); Victor K. Liu, Mountain View, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 15/793,871

(22) Filed: Oct. 25, 2017

(65) Prior Publication Data
US 2018/0113313 A1 Apr. 26, 2018

Related U.S. Application Data

(60) Provisional application No. 62/413,288, filed on Oct. 26, 2016.

(51) Int. Cl.
*G02B 27/01* (2006.01)
*G02B 27/00* (2006.01)
*G02B 5/18* (2006.01)

(52) U.S. Cl.
CPC ....... *G02B 27/0172* (2013.01); *G02B 5/1861* (2013.01); *G02B 5/1866* (2013.01); *G02B 27/0081* (2013.01); *G02B 2027/0112* (2013.01)

(58) Field of Classification Search
None
See application file for complete search history.

(56) References Cited

U.S. PATENT DOCUMENTS

| | | | |
|---|---|---|---|
| 5,309,272 A | 5/1994 | Harris | |
| 5,694,230 A * | 12/1997 | Welch | G02B 5/1814 359/1 |
| 7,817,176 B2 | 10/2010 | Masuda | |
| 8,248,178 B2 | 8/2012 | Lange | |
| 2004/0240064 A1* | 12/2004 | Dutta | G02B 5/18 359/573 |
| 2007/0002447 A1 | 1/2007 | Kawasaki et al. | |

(Continued)

OTHER PUBLICATIONS

Written opinion in PCT/US2017/058351, dated Mar. 5, 2018.*

(Continued)

*Primary Examiner* — Mike Stahl
(74) *Attorney, Agent, or Firm* — Kilpatrick Townsend & Stockton LLP

(57) ABSTRACT

An eyepiece for projecting an image to an eye of a viewer includes a waveguide configured to propagate light therein, and a diffractive optical element optically coupled to the waveguide. The diffractive optical element includes a plurality of first ridges protruding from a surface of the waveguide. Each of the plurality of first ridges has a first height and a first width. The diffractive optical element further includes a plurality of second ridges. Each of the plurality of second ridges protrudes from a respective first ridge and has a second height greater than the first height and a second width less than the first width. The diffractive optical element is configured to diffract a first portion of the light propagating in the waveguide toward the eye, and to diffract a second portion of the light propagating in the waveguide away from the eye.

20 Claims, 23 Drawing Sheets

(56) References Cited

U.S. PATENT DOCUMENTS

| | | | |
|---|---|---|---|
| 2009/0097122 A1* | 4/2009 | Niv | G02B 5/1866 359/575 |
| 2012/0038987 A1* | 2/2012 | Iizuka | G02B 5/1866 359/573 |
| 2012/0057235 A1* | 3/2012 | Chang | B82Y 20/00 359/558 |
| 2016/0231568 A1 | 8/2016 | Saarikko et al. | |
| 2018/0052276 A1* | 2/2018 | Klienman | G02B 6/0076 |

OTHER PUBLICATIONS

International Patent Application No. PCT/US2017/058351, "Invitation to Pay Additional Fees and Partial Search Report", dated Jan. 9, 2018, 2 pages.

\* cited by examiner

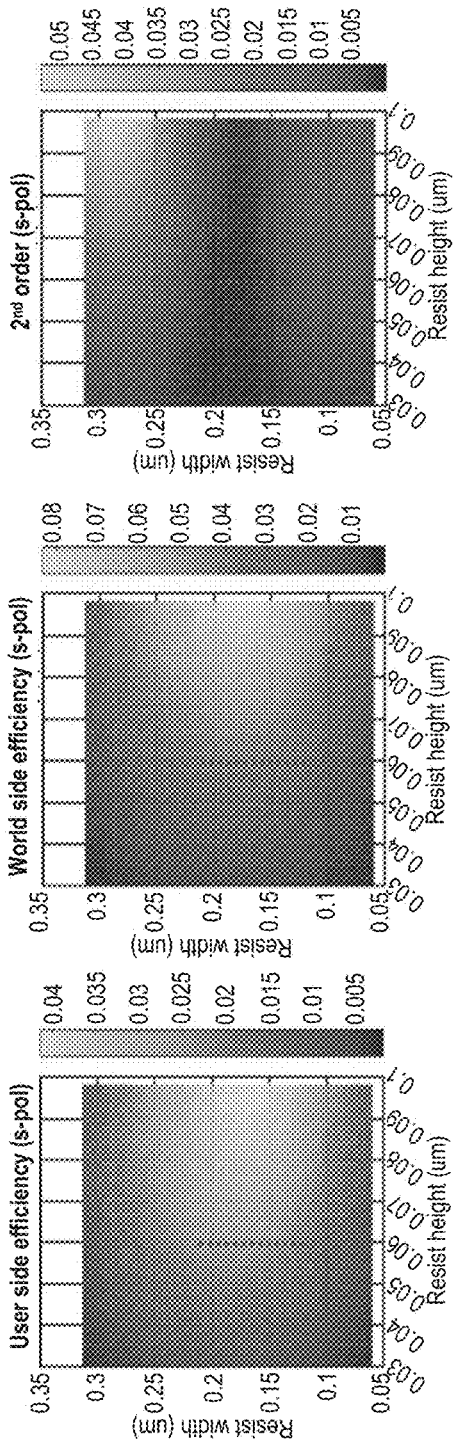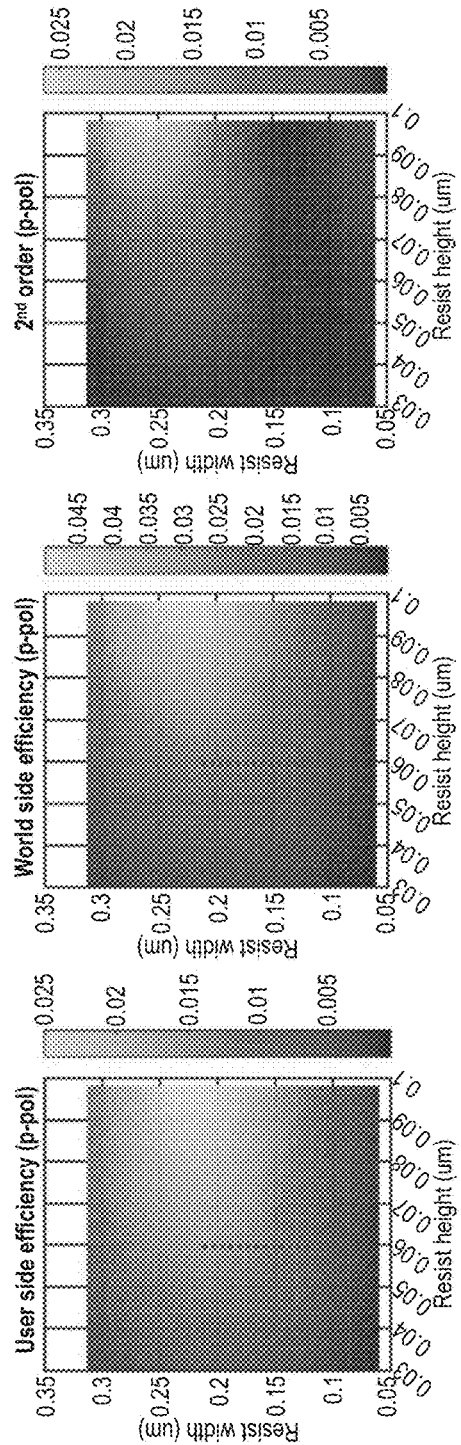

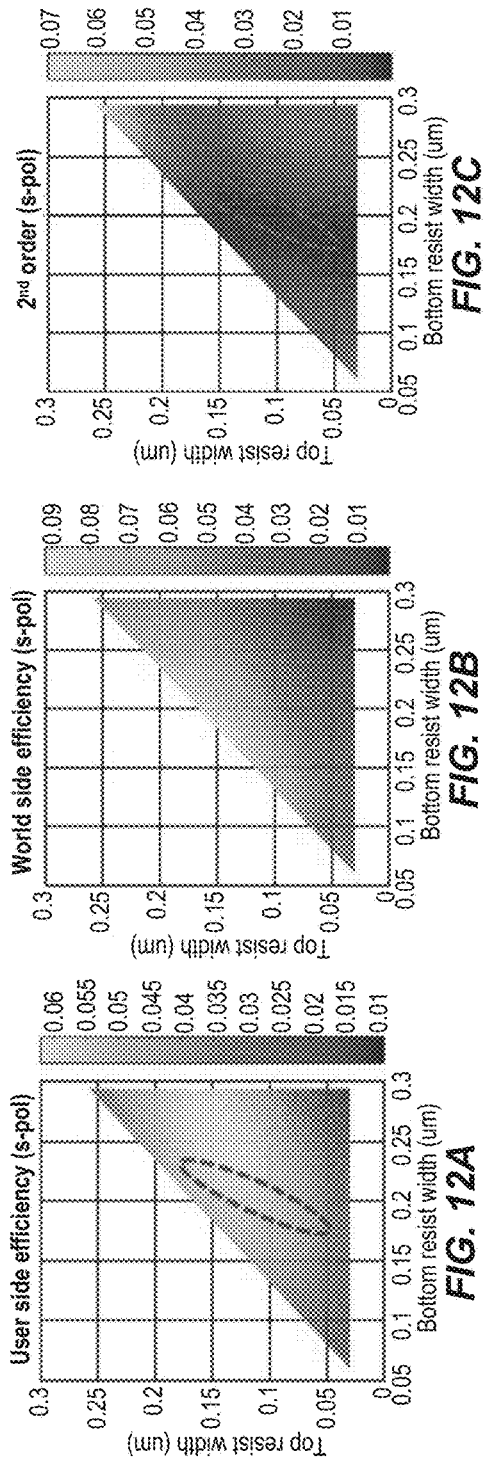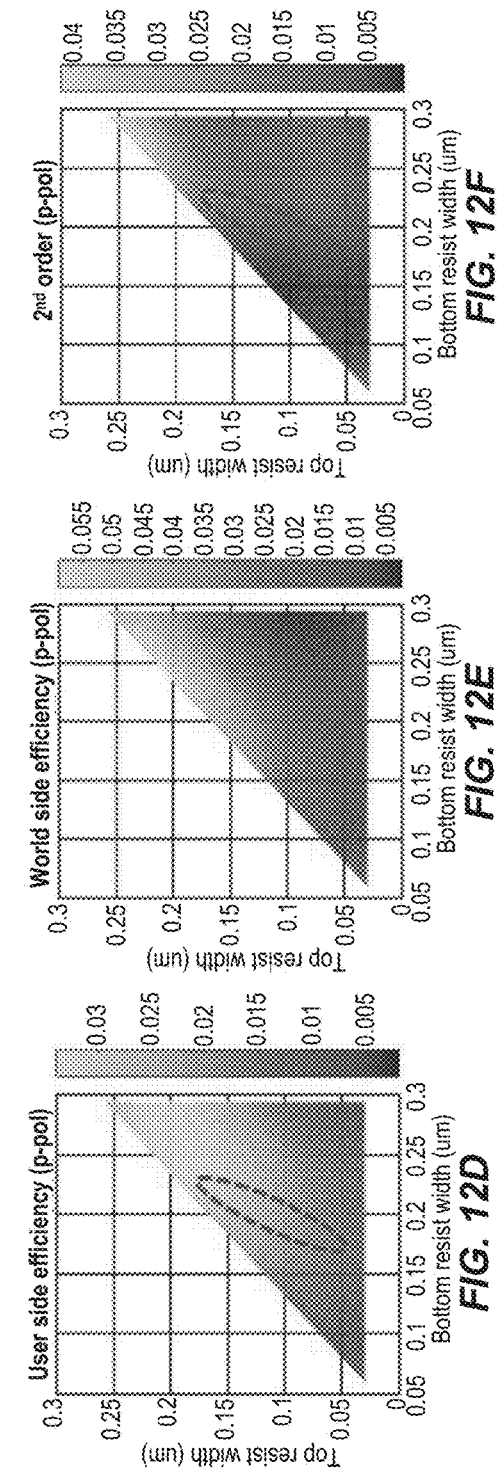

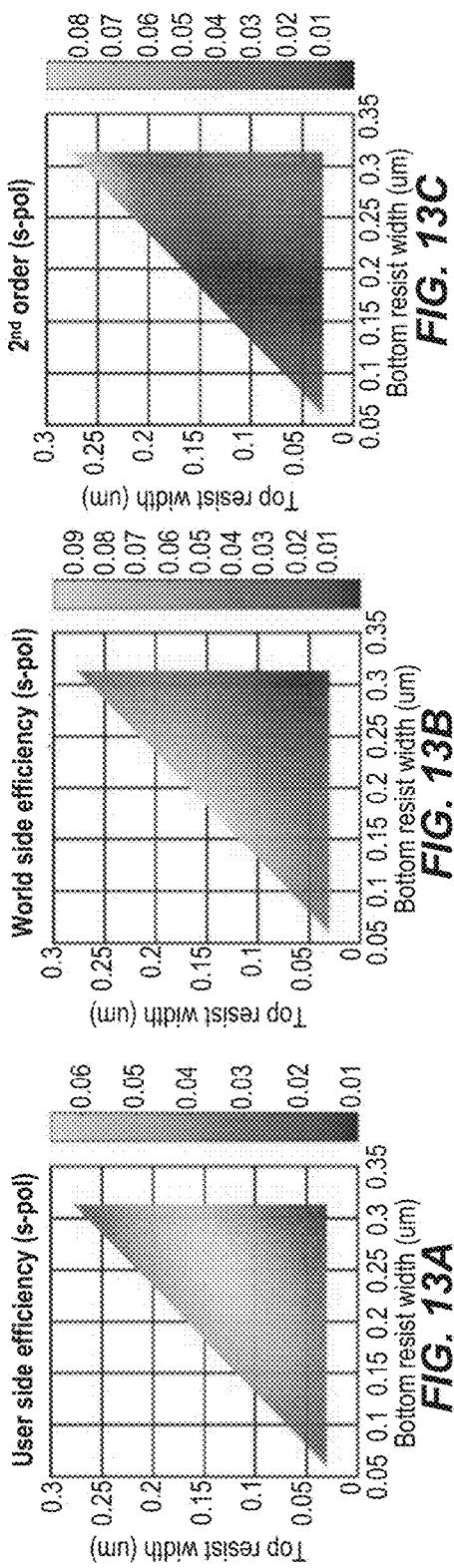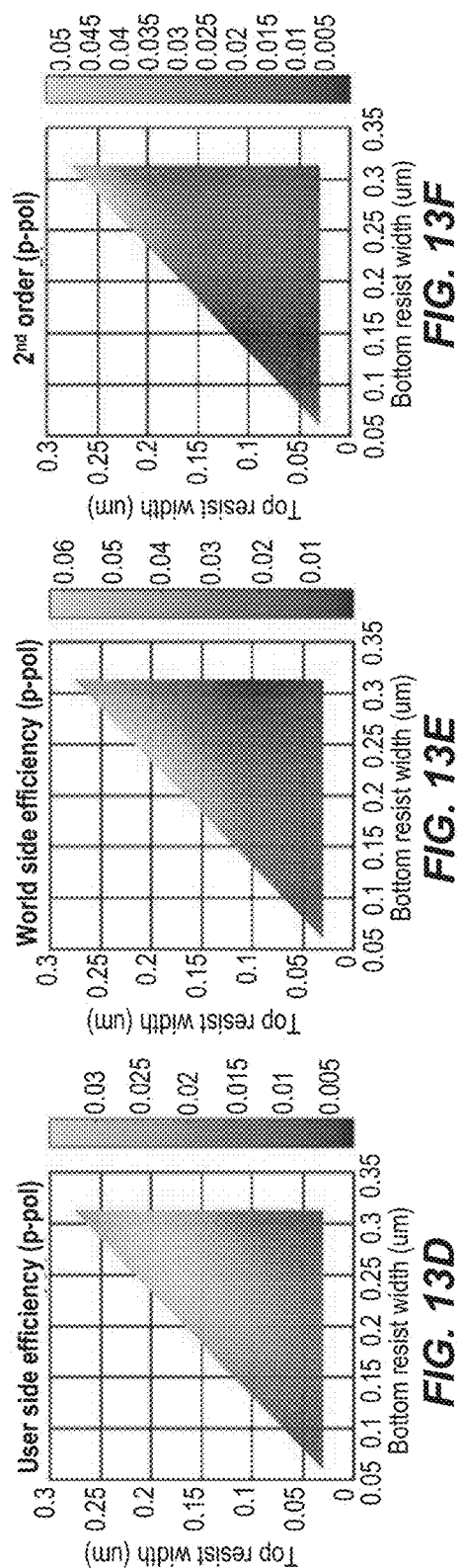

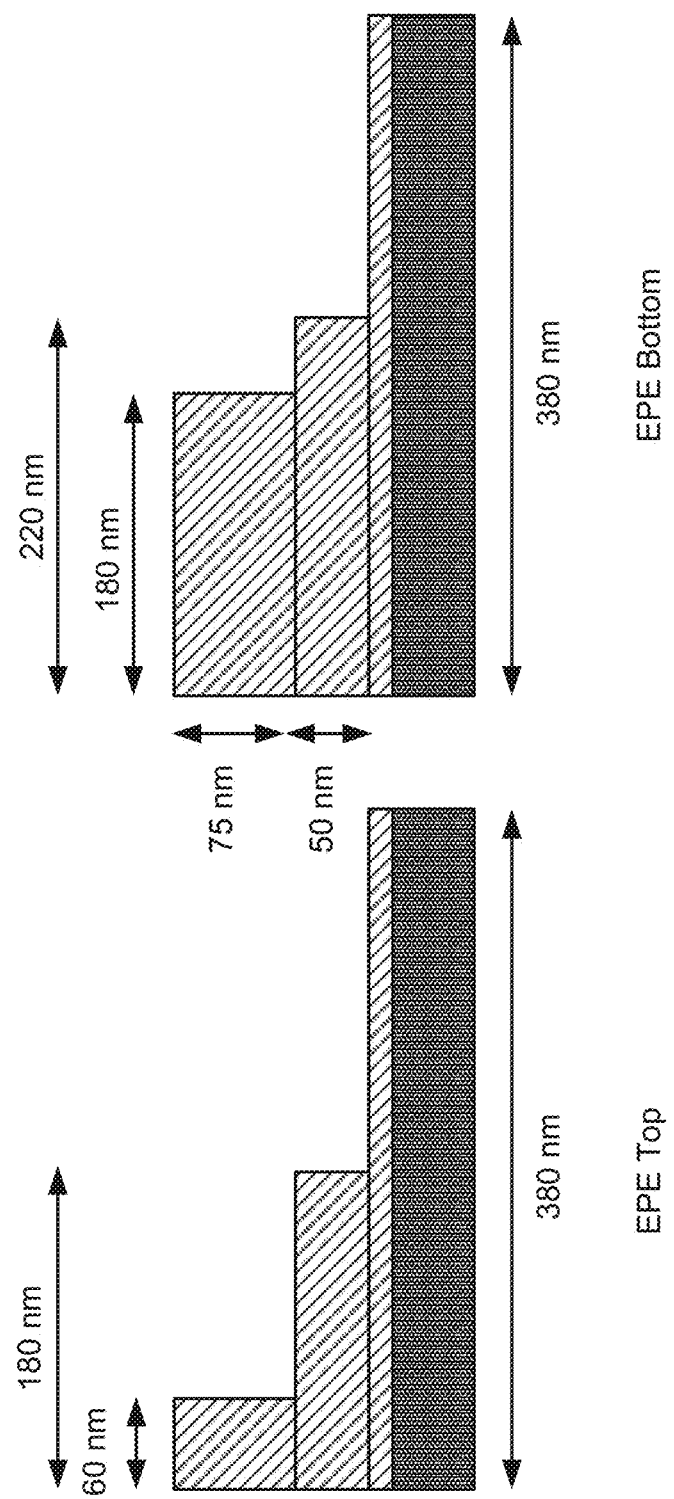

OUTCOUPLING GRATING FOR AUGMENTED REALITY SYSTEM

CROSS-REFERENCES TO RELATED APPLICATIONS

This application claims the benefit of U.S. Provisional Patent Application No. 62/413,288, filed on Oct. 26, 2016, the content of which is incorporated by reference in its entirety.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems.

SUMMARY OF THE INVENTION

According to some embodiments of the present invention, an eyepiece for projecting an image to an eye of a viewer may include a waveguide having a surface and configured to propagate light therein, and a diffractive optical element optically coupled to the waveguide. The diffractive optical element may include a plurality of first ridges protruding from the surface of the waveguide and arranged as a periodic array having a period. Each of the plurality of first ridges has a first height in a direction perpendicular to the surface of the waveguide and a first width in a direction of the period. The diffractive optical element may further include a plurality of second ridges. Each of the plurality of second ridges protrudes from a respective first ridge and has a second height greater than the first height and a second width less than the first width. The diffractive optical element may be configured to diffract a first portion of the light propagating in the waveguide toward the eye as a first order reflection, and to diffract a second portion of the light propagating in the waveguide away from the eye as a first order transmission.

According to some other embodiments of the present invention, an eyepiece for projecting an image to an eye of a viewer may include a waveguide having a surface and configured to propagate light therein, and a diffractive optical element optically coupled to the waveguide. The diffractive optical element may include a plurality of first ridges protruding from the surface of the waveguide and arranged as a periodic array having a period. Each respective first ridge has a respective first width in the direction of the period that varies as a function of a position of the respective first ridge in the direction of the period. The diffractive optical element may further include a plurality of second ridges. Each respective second ridge protrudes from a corresponding first ridge and having a respective second width that is less than a corresponding first width of the corresponding first ridge. Each respective second width may vary as a function of the position of the corresponding first ridge in the direction of the period. The diffractive optical element may be configured to diffract a first portion of the light propagating in the waveguide toward the eye as a first order reflection, and to diffract a second portion of the light propagating in the waveguide away from the eye as a first order transmission.

According to some further embodiments of the present invention, an eyepiece for projecting an image to an eye of a viewer may include a waveguide having a surface and configured to propagate light therein, and a diffractive optical element optically coupled to the waveguide. The diffractive optical element may include a plurality of first ridges protruding from the surface of the waveguide and arranged as a periodic array having a period. Each respective first ridge has a respective first width in the direction of the period. The diffractive optical element may further include a plurality of second ridges. Each respective second ridge protrudes from a corresponding first ridge and has a respective second width that is less than a corresponding first width of the corresponding first ridge. A ratio of the respective second width of the respective second ridge to the corresponding first width of the corresponding first ridge may vary as a function of a position of the corresponding first ridge in the direction of the period. The diffractive optical element may be configured to diffract a first portion of the light propagating in the waveguide toward the eye as a first order reflection, and to diffract a second portion of the light propagating in the waveguide away from the eye as a first order transmission.

BRIEF DESCRIPTION OF THE DRAWINGS

FIGS. 7A-7F show simulated intensity plots of the diffraction efficiencies in various orders of a two-level grating according to some embodiments.

FIGS. 12A-12F show simulated intensity plots of diffraction efficiencies in various orders of a three-level grating according to some embodiments.

FIGS. 13A-13F show simulated intensity plots of diffraction efficiencies in various orders of a three-level grating according to some other embodiments.

FIGS. 22A and 22B show schematic cross-sectional views of one period of a three-level grating at the top of the grating (FIG. 22A) and at the bottom of the grating (FIG. 22B) according to some embodiments of the present invention.

DETAILED DESCRIPTION OF SPECIFIC EMBODIMENTS

The present disclosure relates generally to diffractive optical elements that may be used for virtual reality and augmented reality visualization systems. A diffractive optical element, which can also be referred to as a phase grating or a grating, may be used in an eyepiece for outcoupling image light from a waveguide toward a viewer's eye in a VR or AR system. For purposes of clarity, diffractive optical elements are described herein using the term grating although the present invention is not limited to grating structures, but can include other forms of diffractive optical elements.

Figure 1:
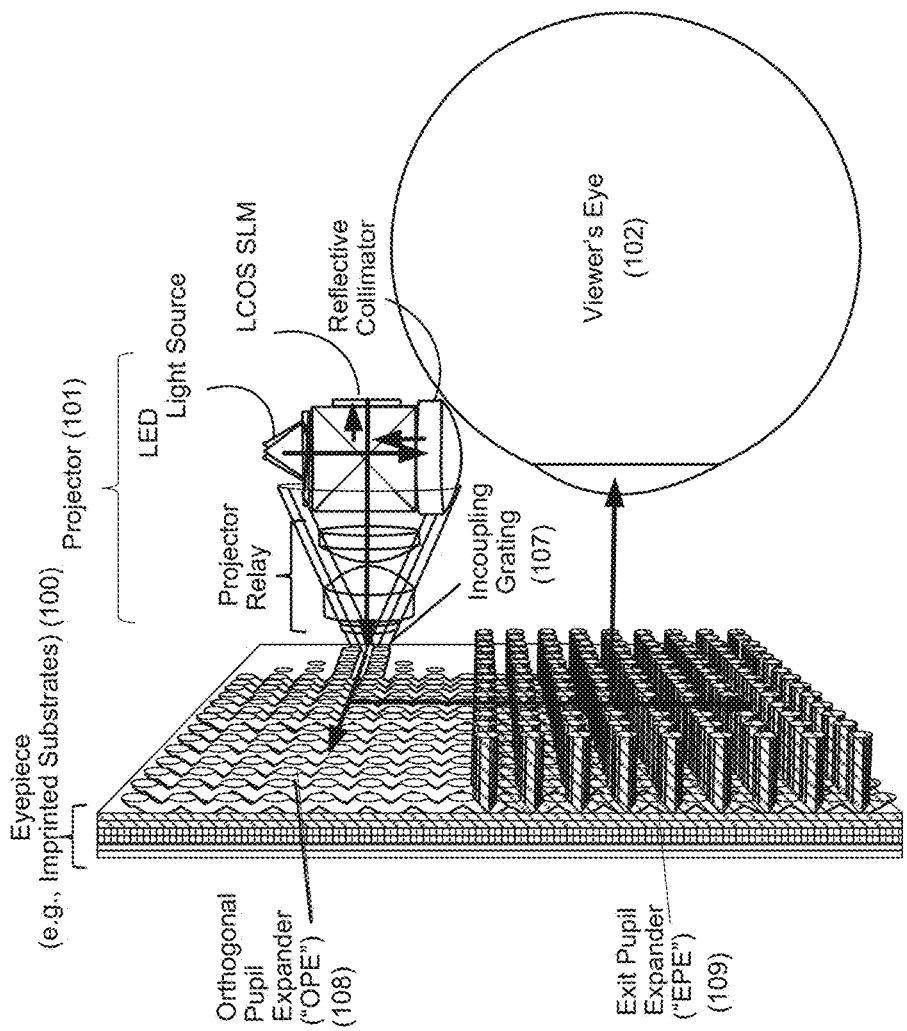
FIG. 1 illustrates schematically the light paths in a viewing optics assembly (VOA) that may be used to present a digital or virtual image to a viewer according to an embodiment of the present invention.

FIG. 1 illustrates schematically the light paths in a viewing optics assembly (VOA) that may be used to present a digital or virtual image to a viewer, according to an embodiment of the present invention. The VOA includes a projector 101 and an eyepiece 100 that may be worn around a viewer's eye. The eyepiece 100 may include one or more eyepiece layers. In one embodiment, the eyepiece 100 includes three eyepiece layers, one eyepiece layer for each of the three primary colors, red, green, and blue. In another embodiment, the eyepiece 100 may include six eyepiece layers, i.e., one set of eyepiece layers for each of the three primary colors configured for forming a virtual image at one depth plane, and another set of eyepiece layers for each of the three primary colors configured for forming a virtual image at another depth plane. In other embodiments, the eyepiece 100 may include three or more eyepiece layers for each of the three primary colors for three or more different depth planes. Each eyepiece layer comprises a planar waveguide and may include an incoupling grating 107, an orthogonal pupil expander (OPE) region 108, and an exit pupil expander (EPE) region 109.

Still referring to FIG. 1, the projector 101 projects image light onto the incoupling grating 107 in an eyepiece layer 100. The incoupling grating 107 couples the image light from the projector 101 into the planar waveguide propagating in a direction toward the OPE region 108. The waveguide propagates the image light in the horizontal direction by total internal reflection (TIR). The OPE region 108 of the eyepiece layer 100 also includes a diffractive element that couples and redirects a portion of the image light propagating in the waveguide toward the EPE region 109. The EPE region 109 includes a diffractive element that couples and directs a portion of the image light propagating in the waveguide in a direction approximately perpendicular to the plane of the eyepiece layer 100 toward a viewer's eye 102. In this fashion, an image projected by projector 101 may be viewed by the viewer's eye 102.

The diffractive element in the EPE region 109 of the eyepiece layer 100 typically comprises a grating, e.g., a periodic structure, formed on a surface of the planar waveguide in the eyepiece. When a beam of light passes through a periodic structure, it will be diffracted into multiple orders. The period of the repeated structure determines the angular separation between the orders. A small period creates large angular separation, while a large period results in closely spaced output beams. The relative power directed into each of the diffracted orders is dictated by the shape and nature of the surface profile within a single grating period.

Figure 2:
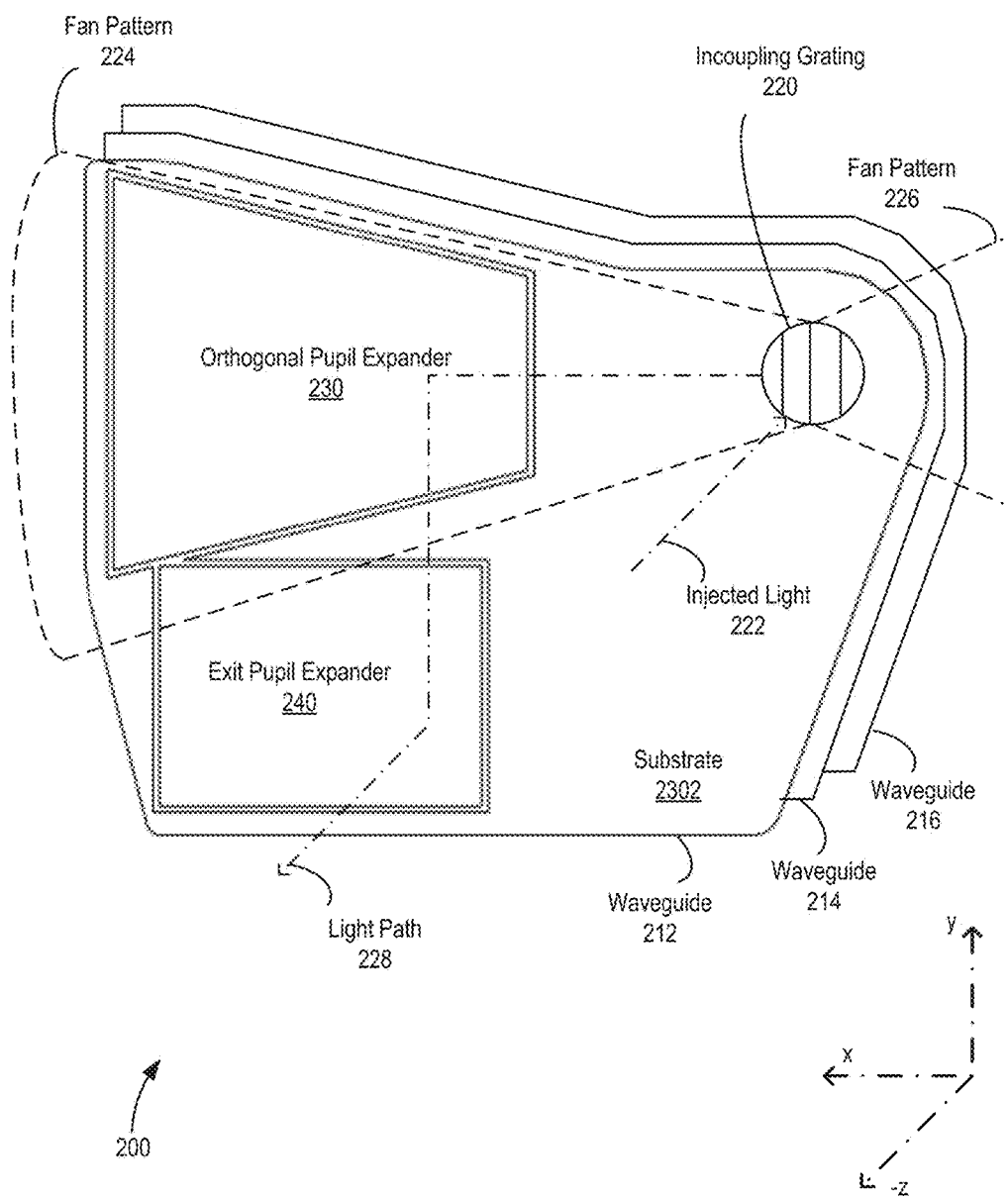
FIG. 2 illustrates an example of a path of a single beamlet of light incoupled into a waveguide of an eyepiece according to an embodiment of the present invention.

FIG. 2 illustrates an example of a path of a single beamlet of light incoupled into a waveguide 212 of an eyepiece 200 according to an embodiment of the present invention. The waveguide 212 can include an ICG 220, an OPE 230, and an EPE 240, each disposed on or within a substrate 202 comprised of a material capable of guiding optical waves by total internal reflection (typically a dielectric material having a high permittivity). In some embodiments, the eyepiece 200 can include three waveguides 212, 214, and 216, each waveguide corresponding to a particular wavelength of light. Additional or fewer waveguides are possible. Each of waveguides 214 and 216 can include an ICG, an OPE, and an EPE, similar to the waveguide 212. In some embodiments, injected light 222 can enter the eyepiece 200 at the ICG 220 in a z-direction orthogonal to the depiction of FIG. 2. The injected light 222 can enter the ICG 220 where the grating within the ICG 220 may diffract certain wavelengths of light within the incoupled light 222, and other wavelengths of the incoupled light 222 continue through to subsequent waveguide layers of the eyepiece 210. In some embodiments, the ICG 220 is a plurality of separate gratings specific to a particular wavelength.

The incoupled light 222 can be diffracted by the ICG 220 in certain directions within the waveguide, spanning a range such as depicted by fan pattern 224 toward the OPE 230 in a generally +x-direction, but also in a range spanning a fan pattern 226 away from the OPE 230 in a generally −x-direction. Other light paths spanning other fan patterns are of course possible and depend on the projection optics, and the particular grating and diffraction pattern configured by the ICG 220. That is, light does not diffract into the waveguide as a diverging beam, but in some embodiments the progressive distributed sampling of portions of image light may create a progressively expanding distribution pattern of beamlets across an eyepiece. The incoupled light 222 that is diffracted within the depicted fan pattern 224 can generally follow a light path 228 to enter the OPE 230 and traverse in an +x-direction, with attendant distributed sampling through the OPE 230 as it strikes the diffractive gratings making up the OPE 230, with portions periodically directed down to the EPE 240 and traversing in a −y-direction before outcoupling in a −z-direction towards the eye of a user.

As FIG. 2 depicts, much light in the wavelength corresponding to the waveguide 212 may be lost either due to directional loss such as light diffracted to the fan pattern 226 or due to capture loss due to an inadequately positioned or sized OPE 230 to capture all light within the fan pattern 224. More details about an eyepiece are described in U.S. patent application Ser. No. 15/683,624, the content of which is incorporated by reference for all purposes.

Figure 3:
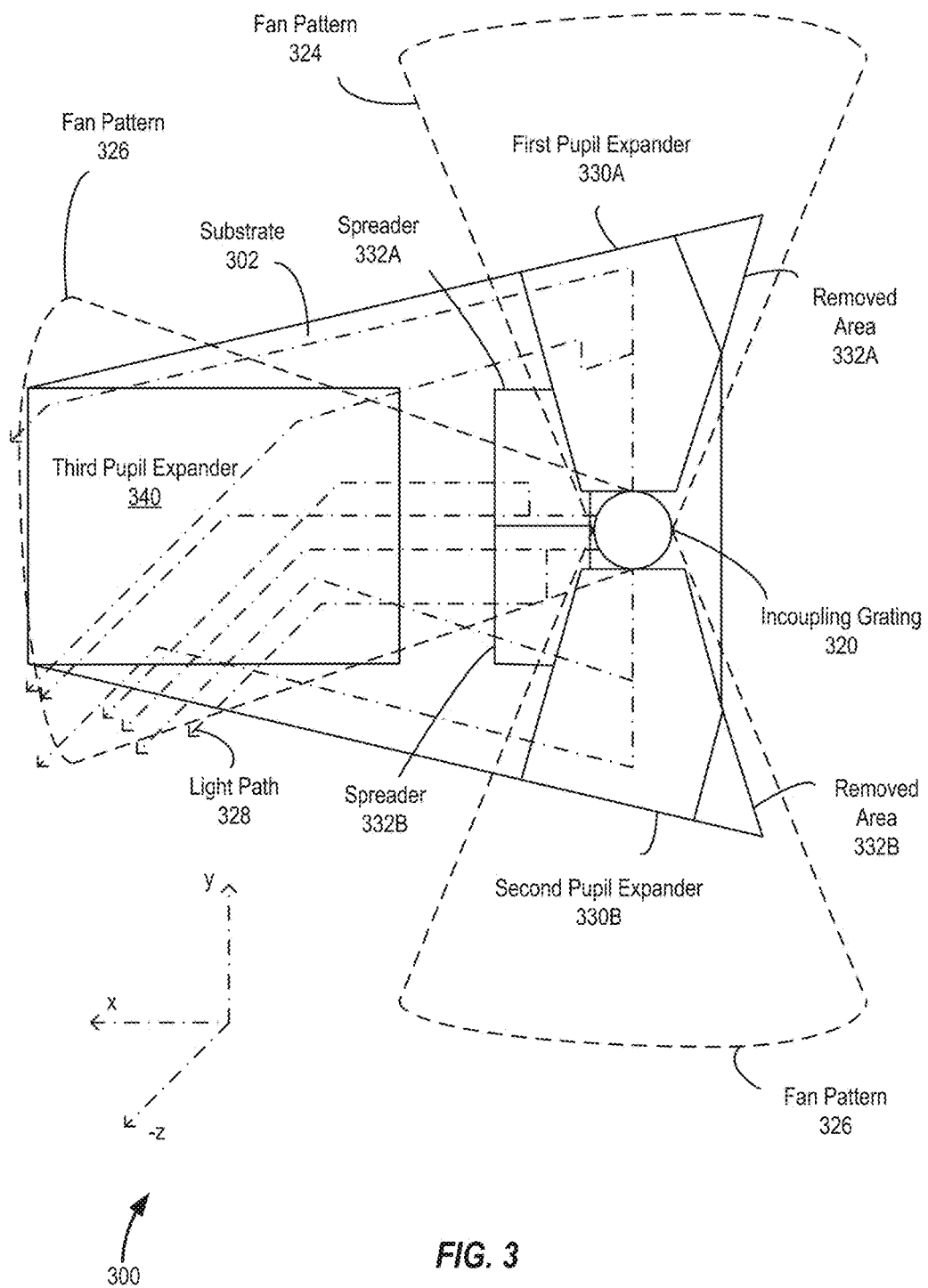
FIG. 3 illustrates an example of a bowtie topology for a waveguide according to an embodiment of the present invention.

FIG. 3 illustrates an example of a bowtie topology for a waveguide 300 according to another embodiment of the present invention. The waveguide 300 may mitigate loss present in other waveguide designs by utilizing light that would typically be diffracted away from the pupil expanders. By orienting the ICG 320 such that the resultant fan patterns are aligned with the y-axis and the x-axis (as shown in FIG. 3), the waveguide 300 can include a first pupil expander 330A and a second pupil expander 330B that capture much more diffracted incoupled light. In some embodiments, the first pupil expander 330A and the second pupil expander 330B can be OPEs. In some embodiments, the waveguide 300 can further include a third pupil expander 340, such as an EPE.

The waveguide 300 can reduce the size of a single OPE (such as those described above) because the waveguide 300 can include two smaller pupil expanders (e.g., the first pupil expander 330A and the second pupil expander 330B). In some embodiments, the first pupil expander 330A and the second pupil expander 330B can be similar to an OPE with a portion removed (e.g., removed area 332A and 332B), as described above. The first pupil expander 330A and the second pupil expander 330B can multiply light received and direct the light to the third pupil expander 340 (as similarly described above). In some embodiments, the first pupil expander 330A and the second pupil expander 330B can direct the light at an angle in the x-y plane rather than in a generally x-direction, as described above. The angle can cause the first pupil expanders 330A and 330B to send light to the third pupil expander 340 as illustrated by light path 328. In some embodiments, the waveguide 300 can approximately double an efficiency compared to other waveguides described herein.

In some embodiments, the waveguide 300 can further include one or more spreaders (e.g., spreader 332A and spreader 332B). The one or more spreaders can capture light that is transmitting from the ICG 320 directly to a center of the third pupil expander 340. The one or more spreaders can include a grating similar to one or more OPEs described herein. In some embodiments, the grating of the one or more spreaders can similarly stair step the light to the third pupil expander 340.

Figure 4A:
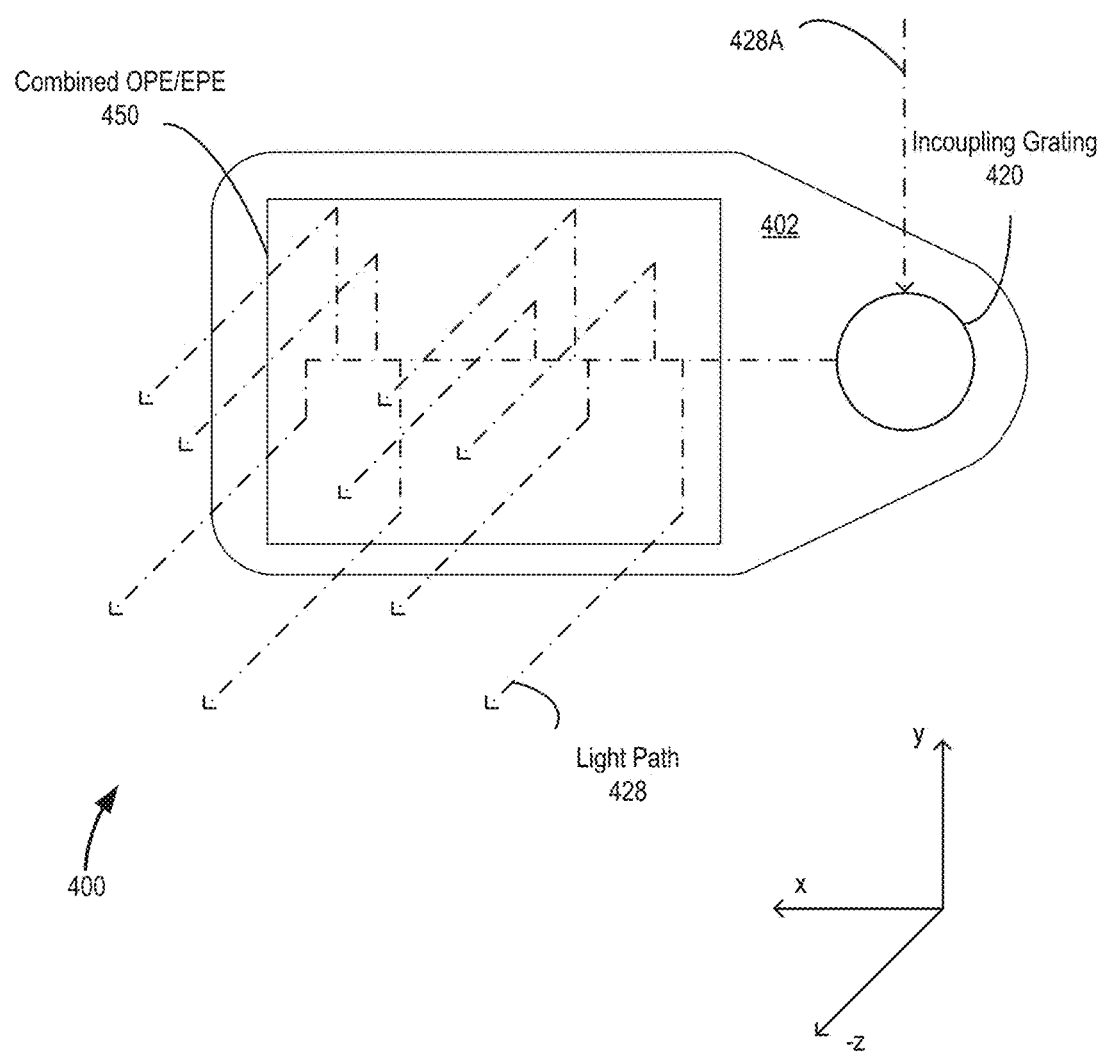
FIG. 4A illustrates an example of a waveguide having a combined OPE/EPE region in a single-sided configuration according to an embodiment of the present invention.

FIG. 4A illustrates an example of a waveguide 400 having a combined OPE/EPE region 450 in a single-sided configuration according to another embodiment of the present invention. The combined OPE/EPE region 450 includes gratings corresponding to both an OPE and an EPE that spatially overlap in the x-direction and the y-direction. In some embodiments, the gratings corresponding to both the OPE and the EPE are located on the same side of a substrate 402 such that either the OPE gratings are superimposed onto the EPE gratings or the EPE gratings are superimposed onto the OPE gratings (or both). In other embodiments, the OPE gratings are located on the opposite side of the substrate 402 from the EPE gratings such that the gratings spatially overlap in the x-direction and the y-direction but are separated from each other in the z-direction (i.e., in different planes). Thus, the combined OPE/EPE region 450 can be implemented in either a single-sided configuration or in a two-sided configuration.

Figure 4B:
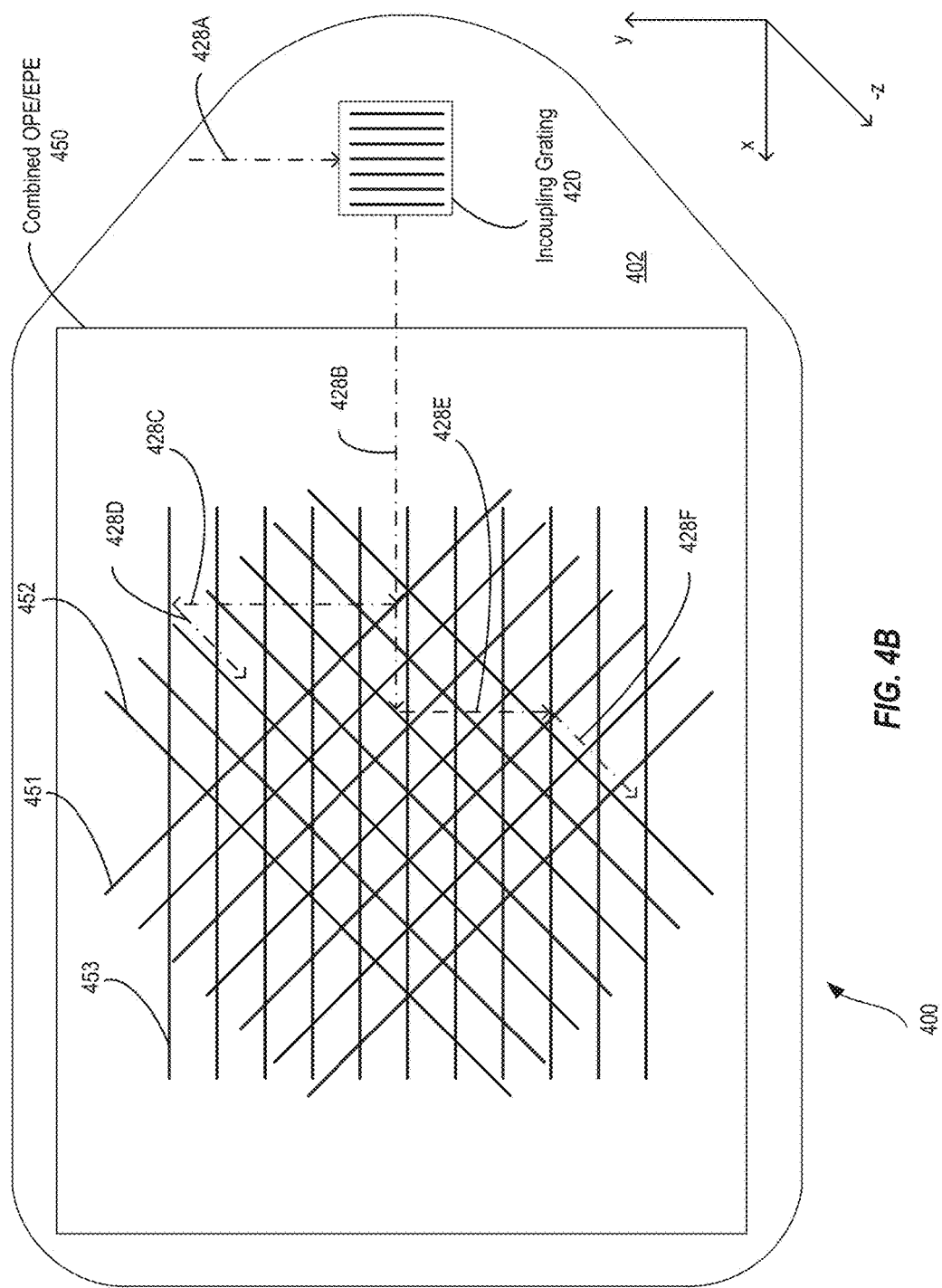
FIG. 4B illustrates an example of a light path within a waveguide according to an embodiment of the present invention.

FIG. 4B illustrates an example of the light path 428 within the waveguide 400 according to an embodiment of the present invention. The light path 428 includes an incident light (denoted as 428A) that is coupled into the substrate 402 at the ICG 420. The incoupled light (denoted as 428B) propagates toward the gratings 451, 452, and 453 by total internal reflection. When these rays encounter the first OPE grating 451, light is diffracted in the +y-direction (denoted as 428C) and is subsequently diffracted in the −z-direction (denoted as 428D) by the EPE grating 453 out of the waveguide 400 toward the user's eye. Similarly, the incoupled light (denoted as 428B) may alternatively encounter the second OPE grating 452 and be diffracted in the −y-direction (denoted as 428E). Light that is diffracted in the −y-direction (denoted as 428E) may be diffracted by the EPE grating 453 out of the waveguide 400 toward the user's eye. Whether light is diffracted in the +y-direction (by the first OPE grating 451) or in the −y-direction (by the second OPE grating 452) is probabilistic and is governed by the grating structures. In general, performance of the combined OPE/EPE region 450 is improved when the incoupled light (denoted as 428B) has a 50% chance of diffracting in either the +y-direction or the −y-direction. In some instances, this is achieved when the first OPE grating 451 and the second OPE grating 452 are perpendicular to each other.

Although waveguide 400 is illustrated as having only a single ICG 420, in some embodiments it may be preferable for waveguide 400 to include a second ICG on the opposite side of the combined OPE/EPE region 450 as the ICG 420. The second ICG may be identical in form and function as the ICG 420 and may be a mirrored version of the ICG 420. For example, whereas the ICG 420 is configured to diffract an incoupled light related to a projected image into the substrate 402, the second ICG 420 may be configured to diffract an incoupled light related to a mirrored version of the projected image (e.g., flipped in the x-direction). In contrast to the light path 428 associated with the ICG 420, the light path associated with the second ICG may include an incident light that is coupled into the substrate 402 at the second ICG. The incoupled light propagates toward the gratings 451, 452, and 453 by total internal reflection. When these rays encounter the first OPE grating 451, light is diffracted in the −y-direction and is subsequently diffracted in the −z-direction by the EPE grating 453 out of the waveguide 400 toward the user's eye. Similarly, the incoupled light may alternatively encounter the second OPE grating 452 and be diffracted in the +y-direction. Light that is diffracted in the +y-direction may be diffracted by the EPE grating 453 out of the waveguide 400 toward the user's eye.

More details about other waveguide topologies are described in U.S. patent application Ser. No. 15/683,624, the content of which is incorporated by reference for all purposes.

Figure 5:
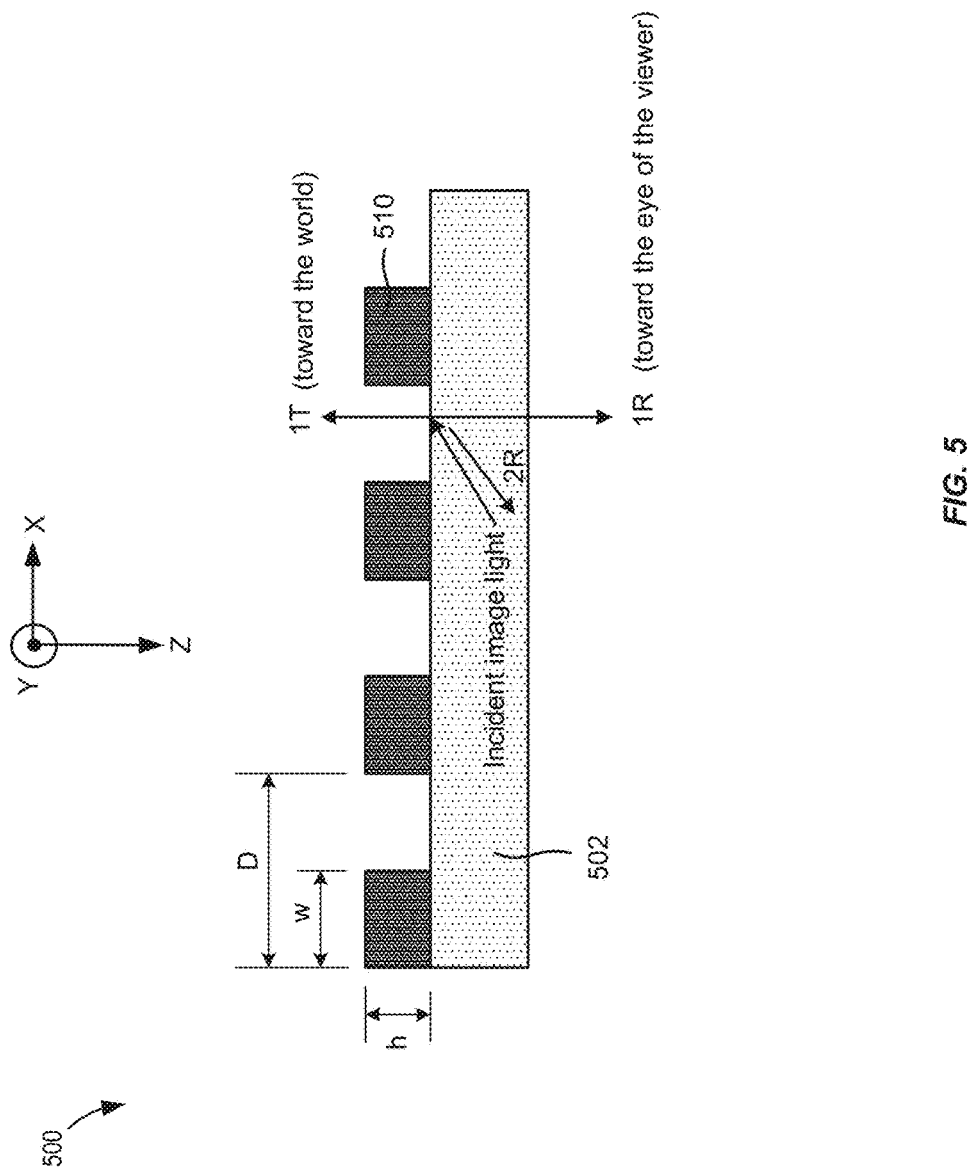
FIG. 5 illustrates schematically a cross-sectional view of a two-level phase grating that may be used in the eyepiece for outcoupling image light from a waveguide toward a viewer's eye according to an embodiment of the present invention.

FIG. 5 illustrates schematically a cross-sectional view of a two-level phase grating 500 that may be used in an eyepiece for outcoupling image light from a waveguide 502 (lying in an X-Y plane) toward a viewer's eye according to an embodiment of the present invention. The two-level grating 500 may include an array of ridges 510 extending along the Y-axis (i.e., in the direction perpendicular to the paper) and protruding from the waveguide 502 (in the negative Z direction). The array of ridges 510 may be periodically arranged along the X direction. Each ridge 210 may have a height h in the Z direction, and a width w in the X direction. For image light incident at the grating 500 from the waveguide 502, the two-level grating 500 may generate a first order reflection (1R) toward the eye of a viewer, a first order transmission (1T) toward the world, and a second order reflection (2R) in a direction substantially opposite to the incident direction, as illustrated in FIG. 5. The relative diffraction efficiencies between different diffraction orders may depend on the duty cycle, i.e., the ratio between the feature width w and the period D. They may also depend on the depth of the grating, i.e., the height h of the ridges.

When the grating 500 is used for outcoupling image light from the waveguide 502 toward a viewer's eye in a VR or AR system, several performance characteristics of the grating may be of concern. First, it may be desirable that more image light is directed toward the viewer than toward the world, as image light directed toward the world is essentially wasted and may also allow others to view what the viewer is viewing. Second, light bouncing within the eyepiece may be diffracted backward via the second order diffraction and then be diffracted out to the viewer. This light may cause an angular error if the waveguide is not perfectly flat or if there is a lensing function built into the grating, which can reduce the modulation transfer function (MTF) and contrast. Thus, it may be desirable to minimize the second order reflection. In addition, light from the world, such as overhead lights, may be diffracted towards the viewer, creating a rainbow effect that may obscure the scene and distract the viewer.

Figure 6:
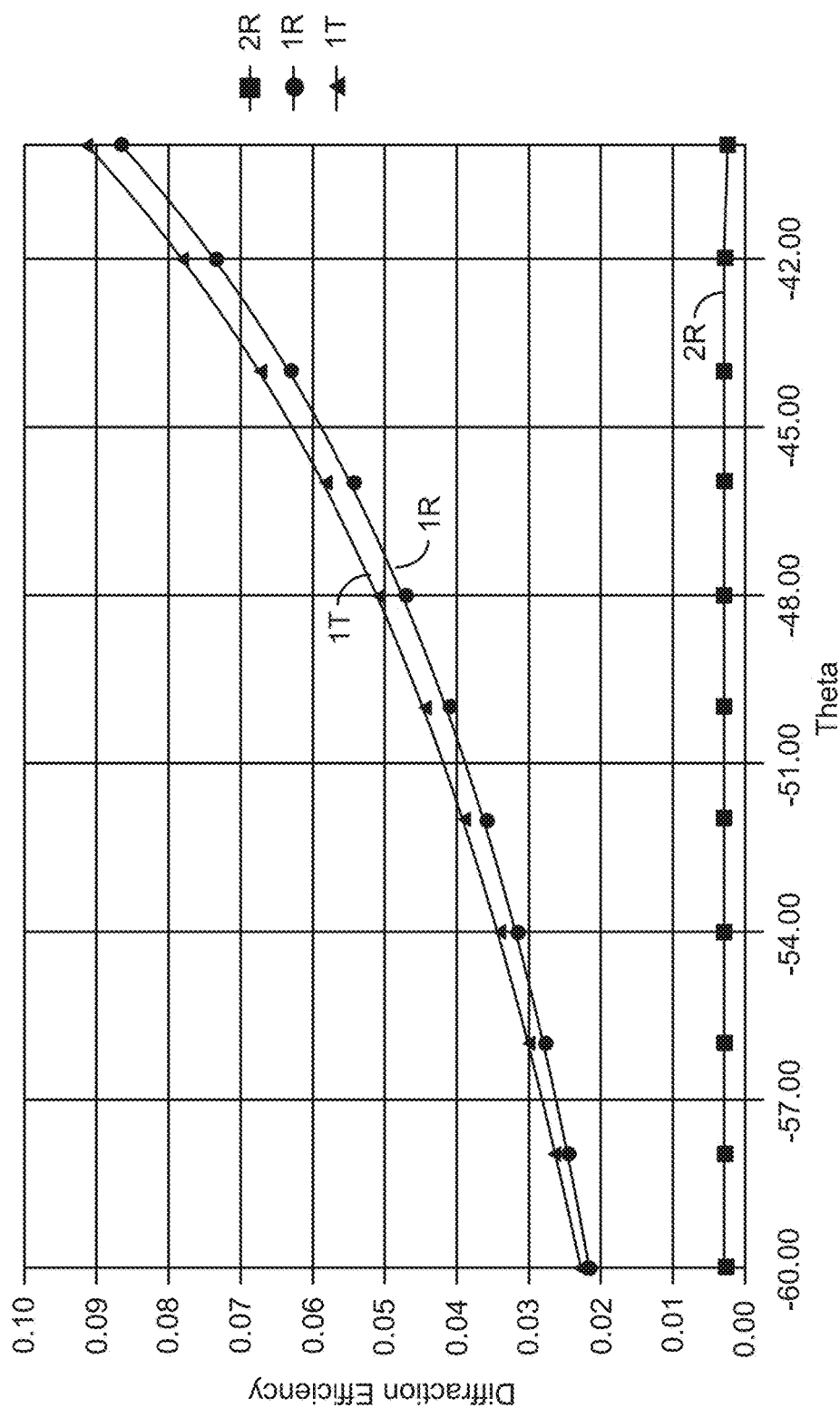
FIG. 6 shows diffraction efficiency curves of an exemplary two-level grating in the first order reflection (1R) and the first order transmission (1T), as well as the second order reflection (2R), as a function of incidence angle theta according to some embodiments of the present invention.

FIG. 6 shows simulated diffraction efficiency curves of an exemplary two-level grating for the first order reflection (1R) and the first order transmission (1T), as well as the second order reflection (2R), as a function of incidence angle theta. As illustrated, the diffraction efficiencies for the first order transmission (1T) is comparable to those of the first order reflection (1R) for the range of incidence angles shown. Thus, about equal amounts of image light may be directed toward the world and toward the viewer.

FIGS. 7A-7F show simulated intensity plots of the diffraction efficiencies in various orders of a two-level grating according to some embodiments. Specifically, FIGS. 7A and 7D show user-side diffraction efficiencies (1R) as a function of feature height h (horizontal axis) and feature width w (vertical axis), for s-polarization and p-polarization, respectively; FIGS. 7B and 7E show world-side diffraction efficiencies (1T) as a function of h (horizontal axis) and w (vertical axis), for s-polarization and p-polarization, respectively; and FIGS. 7C and 7F show second order reflection (2R) as a function of h (horizontal axis) and w (vertical axis), for s-polarization and p-polarization, respectively. The dotted line indicates a range of feature width w corresponding to a feature height h=60 nm that may give rise to a relatively low second order reflection (2R) while having a reasonably high first order reflection (1R). Also, the first order transmission (1T) may be relatively low compared to the first order reflection (1R).

Figure 8:
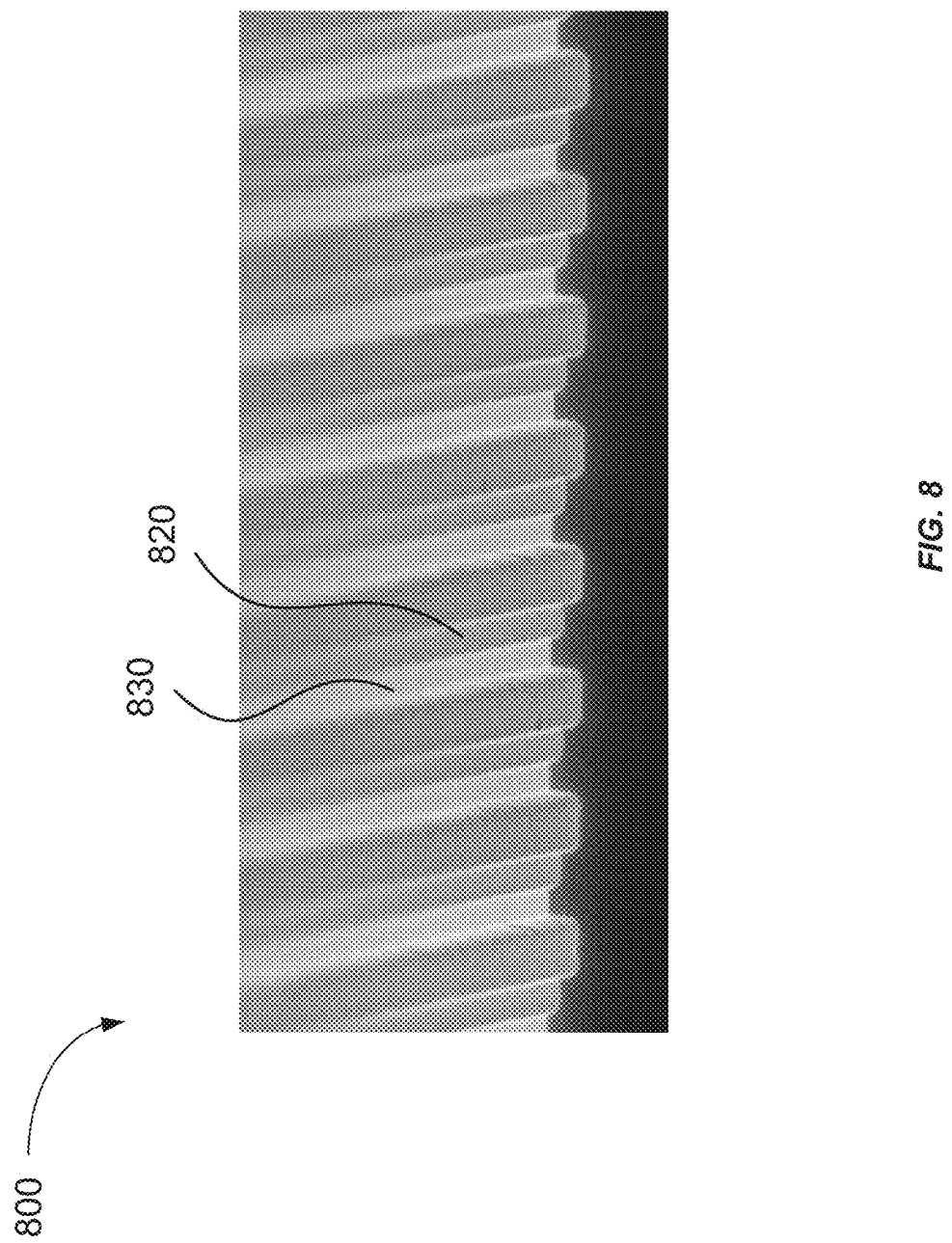
FIG. 8 shows an image of an exemplary three-level grating according to an embodiment of the present invention.
Figure 9:
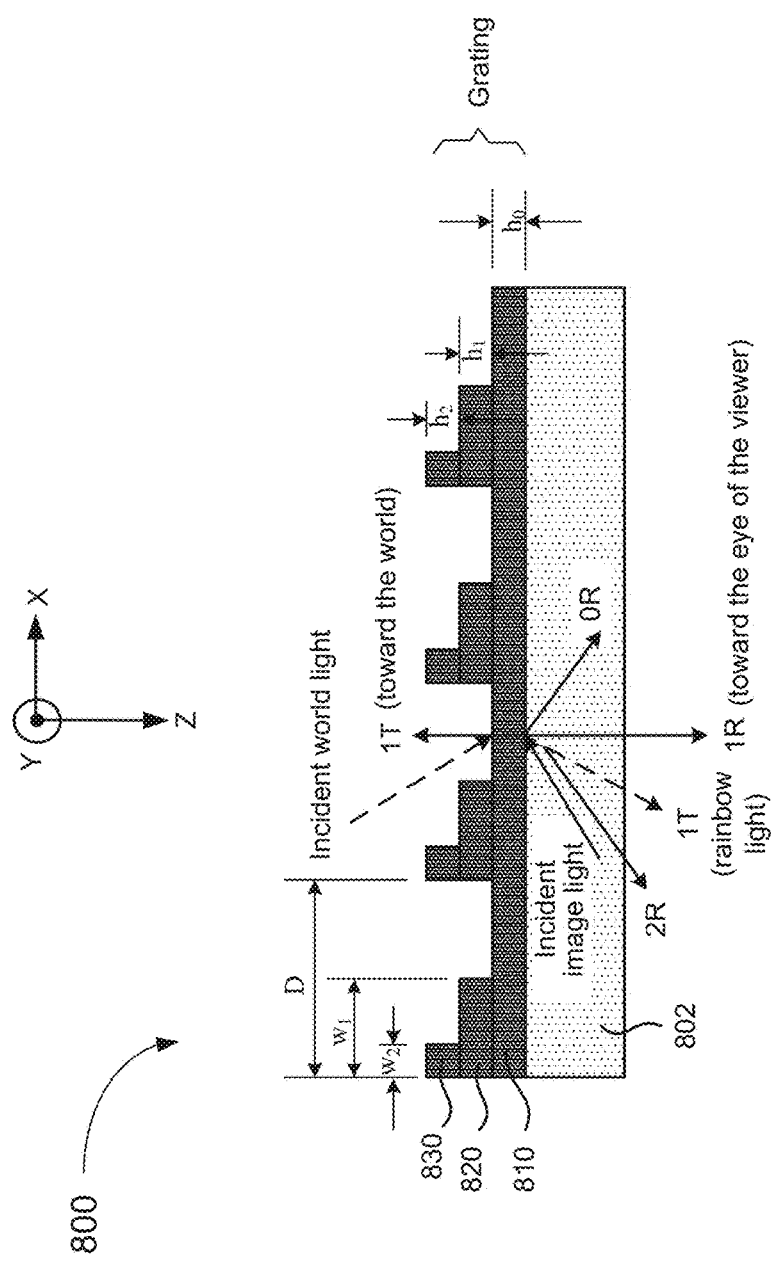
FIG. 9 shows a schematic cross-sectional view a three-level grating according to an embodiment of the present invention.

According to some embodiments of the present invention, improved performance characteristics of the outcoupling grating may be achieved by using multi-level grating structures. FIG. 8 shows an image of an exemplary three-level grating 800 according to an embodiment of the present invention. FIG. 9 shows a schematic cross-sectional view of the grating 800. The grating 800 may include a base layer 810 formed on a waveguide 802. The base layer 810 has a thickness (RLT) $h_0$. In some embodiments, the grating 800 may not have a base layer 810. The grating 800 includes a plurality of first ridges 820 extending along the Y-axis (i.e., in the direction perpendicular to the paper) and protruding from the base layer 810 (in the negative Z direction) with a first height $h_1$. The plurality of first ridges 820 are arranged as a periodic array with a period D defined in the X direction. Each first ridge 820 has a first width $w_1$ in the X direction. The grating 800 further includes a plurality of second ridges 830. Each second ridge 830 protrudes from a respective first ridge 820 (in the negative Z direction) with a second height $h_2$, and has a second width $w_2$ in the X direction.

Referring to FIG. 9, image light is incident from the waveguide 802 on the grating 800. The grating 800 may generate a zeroth order reflected beam (0R) at an angle substantially equal to the incidence angle. The grating 800 may also generate a first order reflected beam (1R) at a direction substantially normal to the waveguide 802 toward the eye of a viewer, and a first order transmitted beam (1T) at a direction substantially normal to the waveguide toward the world. The grating 800 may also generate a second order reflected beam (2R) in a direction approximately opposite to the direction of the incident beam. In addition, world light, such as light from a ceiling lamp, may be incident on the grating 800 from the world side, which may result in a first order transmitted beam (1T) by the grating 800 toward the eye of the viewer, causing a rainbow effect.

Figure 10:
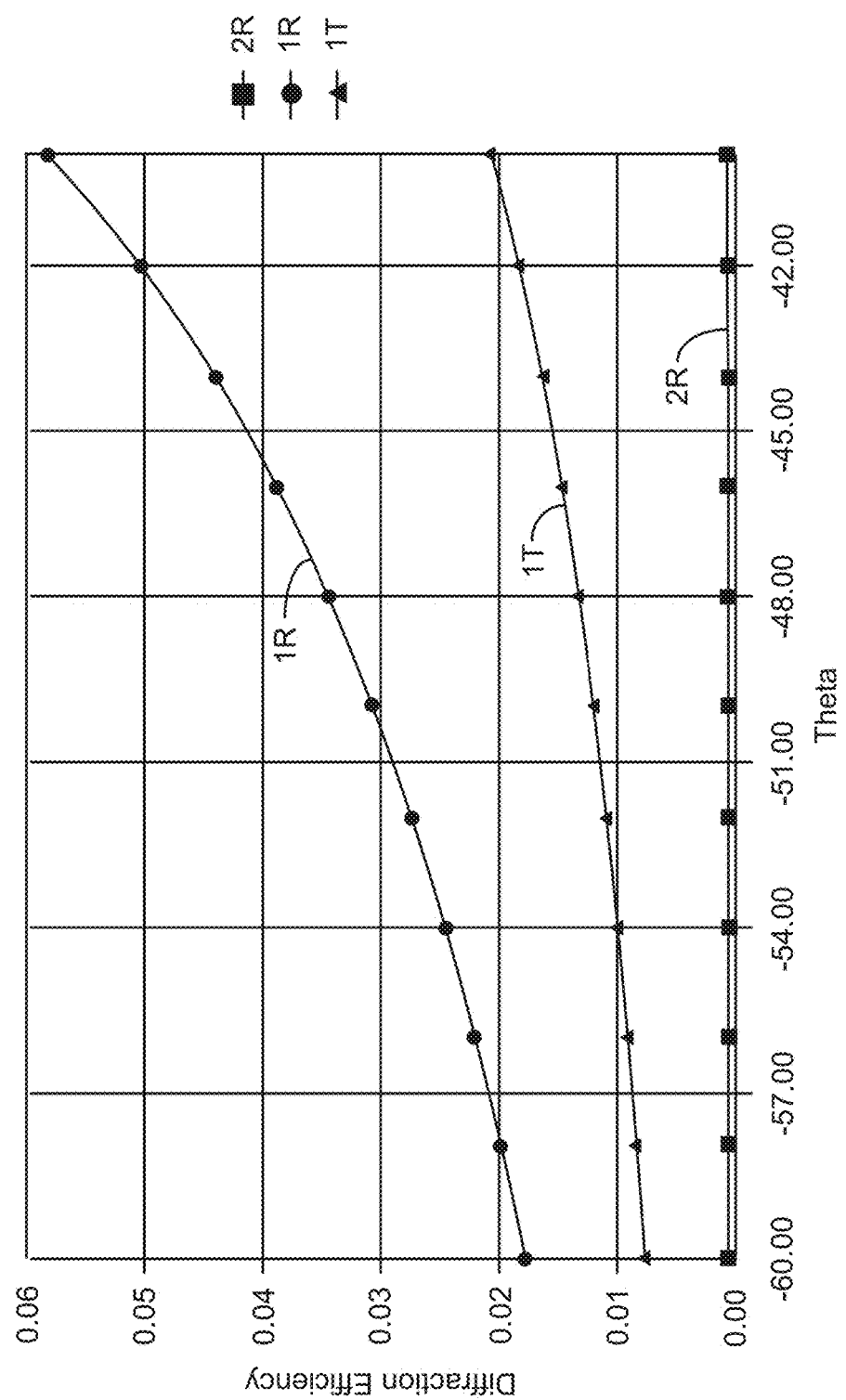
FIG. 10 shows simulated diffraction efficiency curves of an exemplary three-level grating in the first order reflection (1R) and the first order transmission (1T), as well as the second order reflection (2R), as a function of incidence angle theta according to an embodiment of the present invention.

The three-level grating illustrated in FIGS. 8 and 9 may afford several advantages compared to a two-level grating. FIG. 10 shows simulated diffraction efficiency curves of an exemplary three-level grating as a function of incidence angle theta in the range between −40 degrees to −60 degrees (a range typically used for image light) for p-polarized light (0 degree polarization). The three-level grating has the following the grating parameters: $h_0$=30 nm, $h_1$=54 nm, $w_1$=0.5 D, $h_2$=0.0875 μm, and $w_2$=0.25 D. As illustrated, here the first order reflection (1R) is significantly greater than the first order transmission (1T) for the entire range of incidence angles shown. Thus, a greater fraction of the image light may be diffracted toward the viewer than toward the world. The ratio of the first order reflection (1R) and the first order transmission (1T) can be as high as 2:1, and can be nearly 3:1 at some incidence angles. In addition, the second order reflection (2R) is also reduced as compared to that of the two-level grating shown in FIG. 6. In some cases, the diffraction efficiency in the second order reflection (2R) is reduced to well below 1%. In some cases, the diffraction efficiency of the second order reflection (2R) is below 0.5%.

Therefore, the undesirable second order light, which may cause image flare along the direction orthogonal to the groove lines, may be reduced according to some embodiments of the present invention.

Figure 11A:
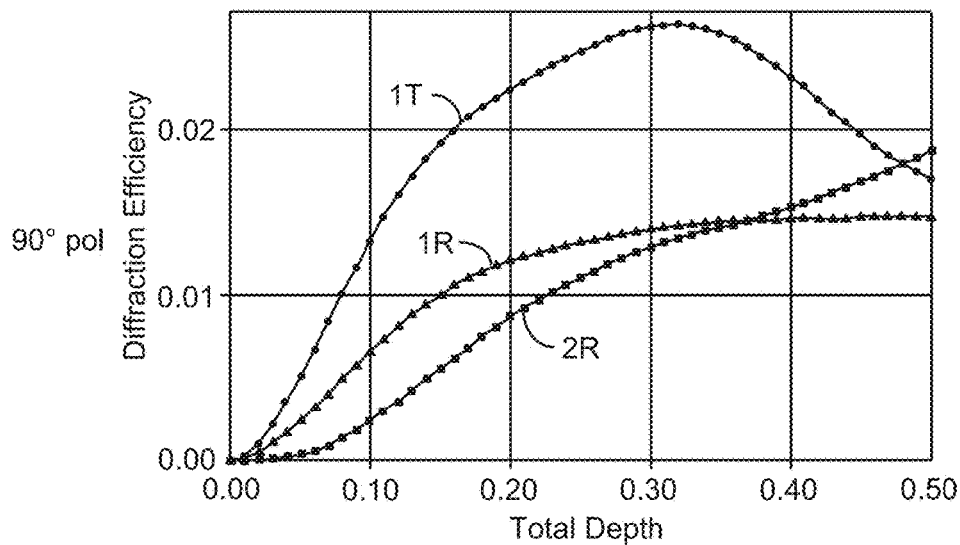
FIGS. 11A and 11B show simulated diffraction efficiency curves of some exemplary three-level gratings as a function of grating depth for s-polarized light (90 degrees polarization, FIG. 11A) and p-polarized light (0 degree polarization, FIG. 11B), according to embodiments of the present invention.
Figure 11B:
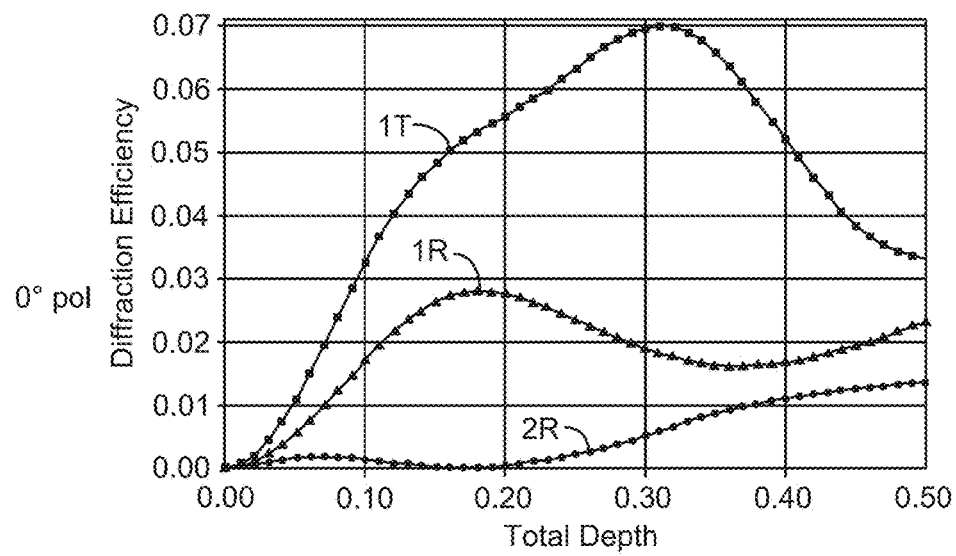

FIGS. 11A and 11B show simulated diffraction efficiency curves of some exemplary three-level gratings as a function of grating depth (i.e., the sum of $h_1$ and $h_2$) for s-polarized light (90 degrees polarization, FIG. 11A) and p-polarized light (0 degree polarization, FIG. 11B). As illustrated, the first order reflection (1R) is greater than the first order transmission (1T) for the entire range of grating depth shown in FIG. 8 for both polarizations. It is also noted that the second order reflection (2R) shows significant polarization dependence. For example, the second order reflection (2R) for p-polarized light is significantly lower than that for s-polarized light. Thus, it may be possible to suppress the second order reflection (2R) by using a polarizer.

Table 1 summarizes simulated diffraction efficiencies in the second order reflection (2R), first order reflection (1R), zero order reflection (0R), and first order transmission (1T) of an exemplary two-level grating for −50 degrees and −30 degrees angles of incidence (theta), for both p-polarized light (0 degree polarization) and s-polarized light (90 degrees polarization), for 520 nm wavelength light, according to some embodiments. Table 2 summarizes simulated diffraction efficiencies in the second order reflection (2R), first order reflection (1R), zero order reflection (0R), and first order transmission (1T) of an exemplary three-level grating for −30 degrees and −50 degrees angles of incidence (theta), for both p-polarized light (0 degree polarization) and s-polarized light (90 degrees polarization), according to some embodiments. As shown, the first order transmission (1T) of the three-level grating at −30 incidence angle for p-polarized light is only 6.6% as compared to 11% for the two-level grating. Also, the first order transmission (1T) of the three-level grating at −30 incidence angle for s-polarized light is only 0.3% as compared to 1.7% for the two-level grating. Thus, the three-level gratings described herein may significantly reduce the undesirable rainbow effect according to some embodiments.

It has been demonstrated that gratings that have more preferable characteristics, such as higher ratios of the first order reflection (1R) and the first order transmission (1T) and lower second order reflection (2R), may follow certain parameter patterns. Referring to FIG. 9, in general, the first width $w_1$ of each first ridge 820 may be advantageously chosen to be about 0.5 D±0.1 D. The second width $w_2$ of each second ridge 830 may be advantageously chosen to be less than or equal to about 0.25 D. The first height $h_1$ of each first ridge 820 may be advantageously chosen to be less than the second height $h_2$ of each second ridge 830. In some embodiments, a ratio of the second height $h_2$ and the first height $h_1$ may be advantageously chosen to be about 8:5. In some embodiments, the following grating parameters for a three-level grating may be advantageously chosen: $h_0$=0.03 μm, $h_1$=0.054 μm, $w_1$=0.5 D, $h_2$=0.0875 μm, and $w_2$=0.2 D.

The three-level grating illustrated in FIG. 9 may be considered as a blazed grating in the sense that the three-level cross-sectional shape can be considered as an approximation of a triangular sawtooth shape. For light incident at an incidence angle close to normal to the blazing surface, as schematically illustrated in FIG. 9, the grating may be called "blazed." For light incident at an incidence angle close to parallel to the blazing surface (i.e., opposite to the incidence angle illustrated in FIG. 9), the grating may be called "anti-blazed." Table 3 compares diffraction efficiencies of an exemplary two-level grating, an exemplary three-level blazed grating, and an exemplary three-level anti-blazed grating according to some embodiments of the present invention. As shown, the two-level grating may have comparable diffraction efficiencies to the viewer (the first order reflection 1R) and to the world (the first order transmission, 1T). The three-level blazed grating may have a higher diffraction efficiency to the viewer than to the world. On the other hand, the three-level anti-blazed grating may have a higher diffraction efficiency to the world than to the viewer. Thus, the three-level blazed grating may be preferred over the binary grating and the three-level anti-blazed grating.

TABLE 3

|  | Efficiency (%) EPE to viewer | Efficiency (%) EPE to world |
| --- | --- | --- |
| Two-level grating | 1.53 | 1.48 |
| Three-level blazed grating | 2.08 | 1.36 |
| Three-level anti-blazed grating | 0.93 | 2.56 |

TABLE 1

| Polarization | 2R | 1R | 0R | 1T | theta |
| --- | --- | --- | --- | --- | --- |
| 0.0000 | 0.0063315115 | 0.042606835 | 0.889826498 | 0.061251511 | −50 |
| 90.000 | 0.012548442 | 0.024650098 | 0.931271532 | 0.031529927 | −50 |
| 0.0000 | 0 | 0.050533856 | 0.004828623 | 0.109664217 | −30 |
| 90.000 | 0 | 0.029522560 | 0.035912803 | 0.016903517 | −30 |

TABLE 2

| Polarization | 2R | 1R | 0R | 1T | theta |
| --- | --- | --- | --- | --- | --- |
| 0.0000 | 0.000594872 | 0.050695651 | 0.928987394 | 0.019722082 | −50 |
| 90.000 | 0.008069904 | 0.018196041 | 0.965302811 | 0.008431243 | −50 |
| 0.0000 |  | 0.080741167 | 0.022736306 | 0.065726994 | −30 |
| 90.000 |  | 0.042537267 | 0.020530137 | 0.002793524 | −30 |

Referring to FIG. 9, an optimization algorithm may allow the first height $h_1$ and the first width $w_1$ of each first ridge 820, the second height $h_2$ and the second width $w_2$ of each second ridge 830 to vary, and optimize for higher user-side diffraction efficiency (1R), lower world-side diffraction efficiency (1T), and lower second order reflection (2R). In some embodiments, the grating period D may be assumed to have a value of D=380 nm, $h_1$ and $h_2$ may be assumed to have the values of $h_1$=50 nm and $h_2$=75 nm, and the nominal values of $w_1$ and $w_2$ are assumed to be $w_1$=210 nm and $w_2$=170 nm. Then $w_1$ and $w_2$ may be varied to optimize for higher first order reflection (1R).

In an exemplary optimization simulation, it is assumed that the angle of incidence is 50 degrees, the thickness of the base layer 810 is $h_0$=20 nm, and $h_1$ and $h_2$ has the values of $h_1$=50 nm and $h_2$=75 nm. It is further assumed that the grating has an index of refraction of $n_1$=1.54, and the waveguide 802 has an index of refraction of $n_2=1.8$. $w_1$ is varied from 2m to D−m, where m is the minimum feature size and D is the grating period. In one embodiment, it is assumed that D=380 nm, and m=30 nm (the feature size for e-beam lithography). $w_2$ is varied from m to $w_1$−m. In some cases, $w_2$ may be equal to $w_1$, or $w_2$ may be equal to zero (which corresponds to a two-level grating without the second ridges).

FIGS. 12A-12F show simulated intensity plots of diffraction efficiencies in various orders of a three-level grating according to some embodiments. Specifically, FIGS. 12A and 12D show user-side diffraction efficiencies (1R) as a function of $w_1$ (horizontal axis) and $w_2$ (vertical axis), for s-polarization and p-polarization, respectively; FIGS. 12B and 12E show world-side diffraction efficiencies (1T) as a function of $w_1$ (horizontal axis) and $w_2$ (vertical axis), for s-polarization and p-polarization, respectively; and FIGS. 12C and 12F show second order reflection (2R) as a function of $w_1$ (horizontal axis) and $w_2$ (vertical axis), for s-polarization and p-polarization, respectively. As illustrated in FIGS. 12C and 12F, the second order reflection (2R) may be relatively low for the parameter space of $w_1$ and $w_2$ within the dashed elliptical area. As illustrated in FIGS. 12A and 12D, the user-side diffraction efficiency (1R) may be reasonably high in the same parameter space of $w_1$ and $w_2$ within the dashed elliptical area.

FIGS. 13A-13F show simulated intensity plots of diffraction efficiencies in various orders of a three-level grating according to some other embodiments. It is assumed that $h_1$=60 nm, $h_2$=75 nm, and $h_0$=20 nm. Specifically, FIGS. 13A and 13D show user-side diffraction efficiencies (1R) as a function of $w_1$ (horizontal axis) and $w_2$ (vertical axis), for s-polarization and p-polarization, respectively; FIGS. 13B and 13E show world-side diffraction efficiencies (1T) as a function of $w_1$ (horizontal axis) and $w_2$ (vertical axis), for s-polarization and p-polarization, respectively; and FIGS. 13C and 13F show second order reflection (2R) as a function of $w_1$ (horizontal axis) and $w_2$ (vertical axis), for s-polarization and p-polarization, respectively.

Figure 14A:
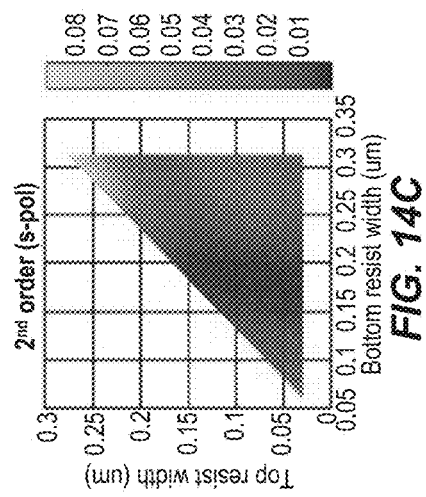
FIGS. 14A-14F show simulated intensity plots of diffraction efficiencies in various orders of a three-level grating according to some additional embodiments.
Figure 14B:
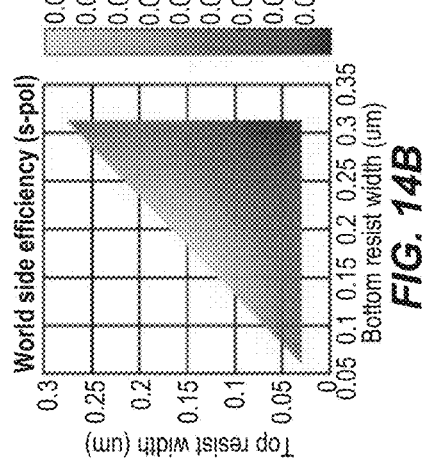
Figure 14C:
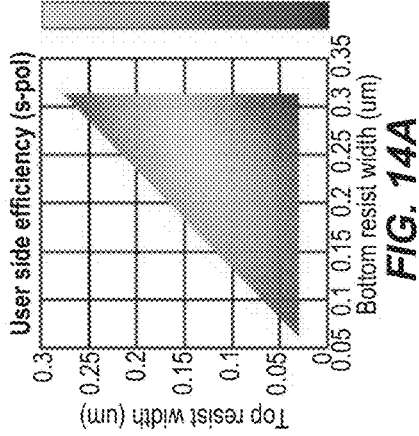
Figure 14D:
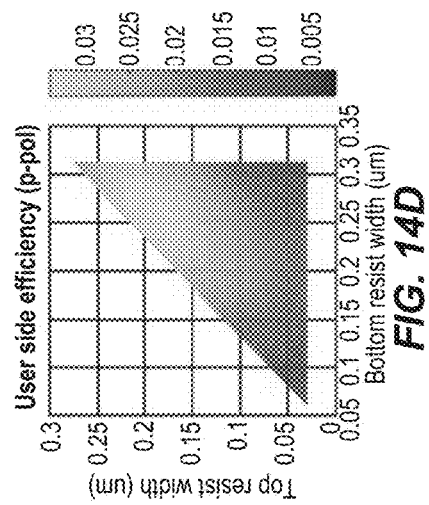
Figure 14E:
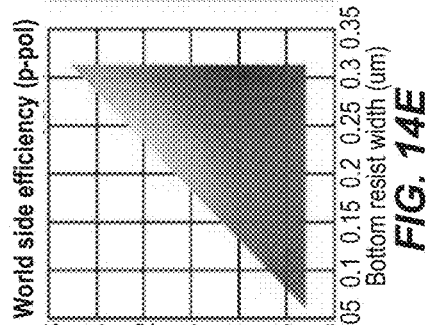
Figure 14F:
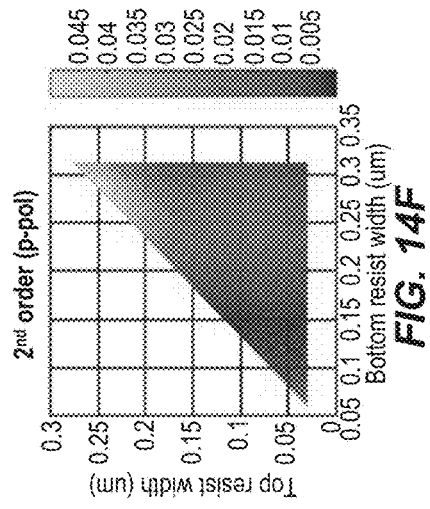

FIGS. 14A-14F show simulated intensity plots of diffraction efficiencies in various orders of a three-level grating according to some additional embodiments. It is assumed that $h_1$=60 nm, $h_2$=75 nm, and $h_0$=30 nm. Specifically, FIGS. 14A and 14D show user-side diffraction efficiencies (1R) as a function of $w_1$ (horizontal axis) and $w_2$ (vertical axis), for s-polarization and p-polarization, respectively; FIGS. 14B and 14E show world-side diffraction efficiencies (1T) as a function of $w_1$ (horizontal axis) and $w_2$ (vertical axis), for s-polarization and p-polarization, respectively; and FIGS. 14C and 14F show second order reflection (2R) as a function of $w_1$ (horizontal axis) and $w_2$ (vertical axis), for s-polarization and p-polarization, respectively.

In general, it may be observed that diffraction efficiencies for s-polarized light is higher than those for p-polarized light. Thus s-polarized leaks out faster than p-polarized. Therefore, it may be assumed that the light propagating in the waveguide is mostly p-polarized.

It may be desirable to have uniform light output from the grating across the EPE section of the eyepiece (e.g., the eyepiece illustrated in FIGS. 1 and 2). As light propagates in the waveguide from top to bottom, more and more light is diffracted out of the waveguide by the grating. Thus, it may be advantageous to have a grating with a diffraction efficiency that increases as the distance from the top of the grating increases, so that more and more percentage of light is coupled out as the amount of light remaining in the waveguide decreases, thereby resulting in a relatively uniform light output across the EPE section.

In some embodiments, a 100 nm line-width grating (i.e., $w_1$=100 nm, $w_2$=0) near the top of the waveguide may conserve light within the waveguide by maintaining a low outcoupling efficiency, so that there is sufficient light remaining within the waveguide to be emitted near the end of the EPE. A 260/150 nm line-widths grating (i.e., $w_1$=260 nm, $w_2$=150 nm) near the bottom of the waveguide may outcouple most of the remaining light out of the waveguide.

Figure 15:
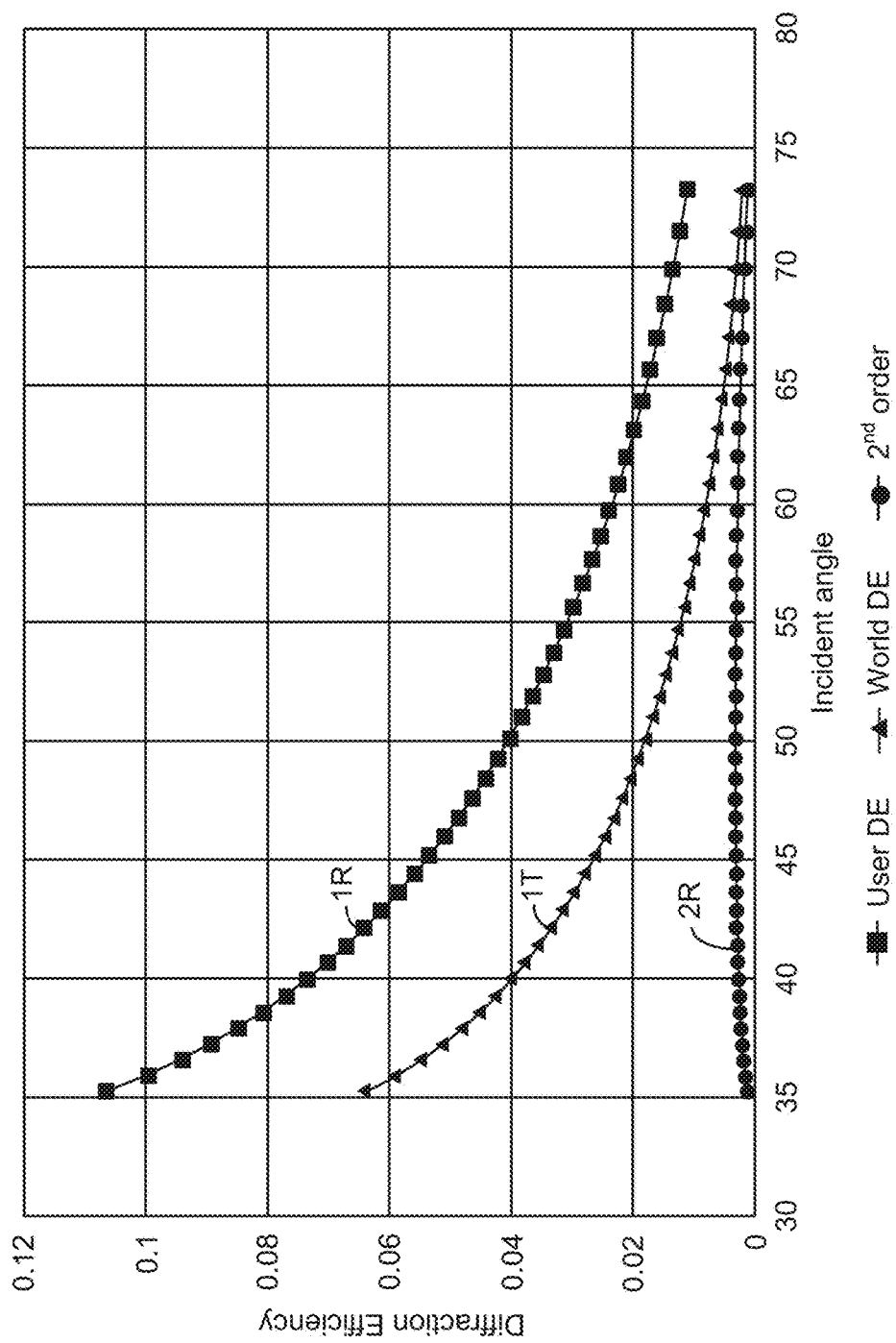
FIG. 15 shows simulated diffraction efficiencies for the first order reflection (1R), first order transmission (1T), and second order reflection (2R), as a function of incidence angle, for an exemplary three-level grating according to some embodiments of the present invention.

FIG. 15 shows simulated diffraction efficiencies for the first order reflection (1R), first order transmission (1T), and second order reflection (2R), as a function of incidence angle. It is assumed that $h_1$=50 nm, $h_2$=75 nm, $w_1$=200 nm, and $w_2$=120 nm. As illustrated, both the first order reflection (1R) and the first order transmission (1T) increase for decreasing incidence angle. Thus, the first order reflection (1R) has greater values at lower incidence angles (corresponding to the bottom of the field of view) than at higher incidence angles (corresponding to the top of the field of view). Therefore, light at the bottom of the field of view (FOV), which has the shortest bounce spacing, is coupled out most quickly.

It may be the case that an anti-blazed grating can be better for field uniformity. However, as discussed above, a blazed grating may have better user-side efficiency. In some embodiments, a two-level grating may strike a better balance. In one embodiment, a two-level grating may be configured such that its duty cycle (i.e., the ratio of the feature width and the period w/D) increases as the distance x from the top of the grating increases, so that the grating efficiency increases as the distance x increases.

Figure 16:
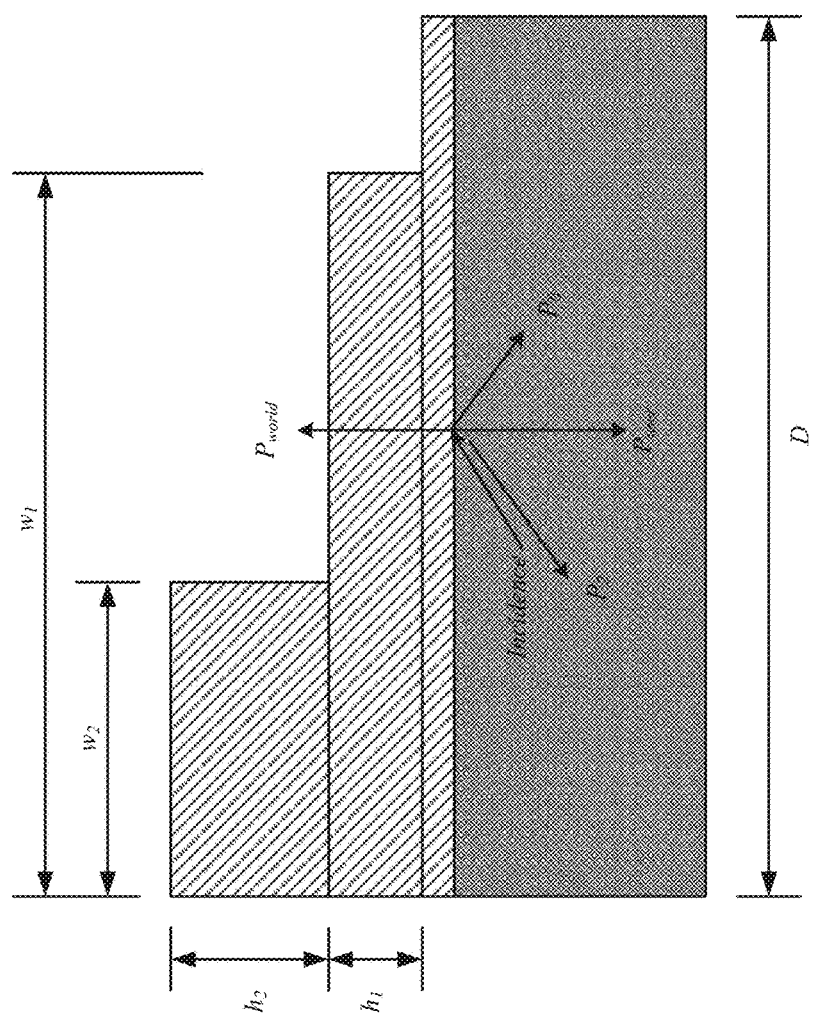
FIG. 16 illustrates a schematic cross-sectional view of one period of a three-level grating according to an embodiment of the present invention.
Figure 17:
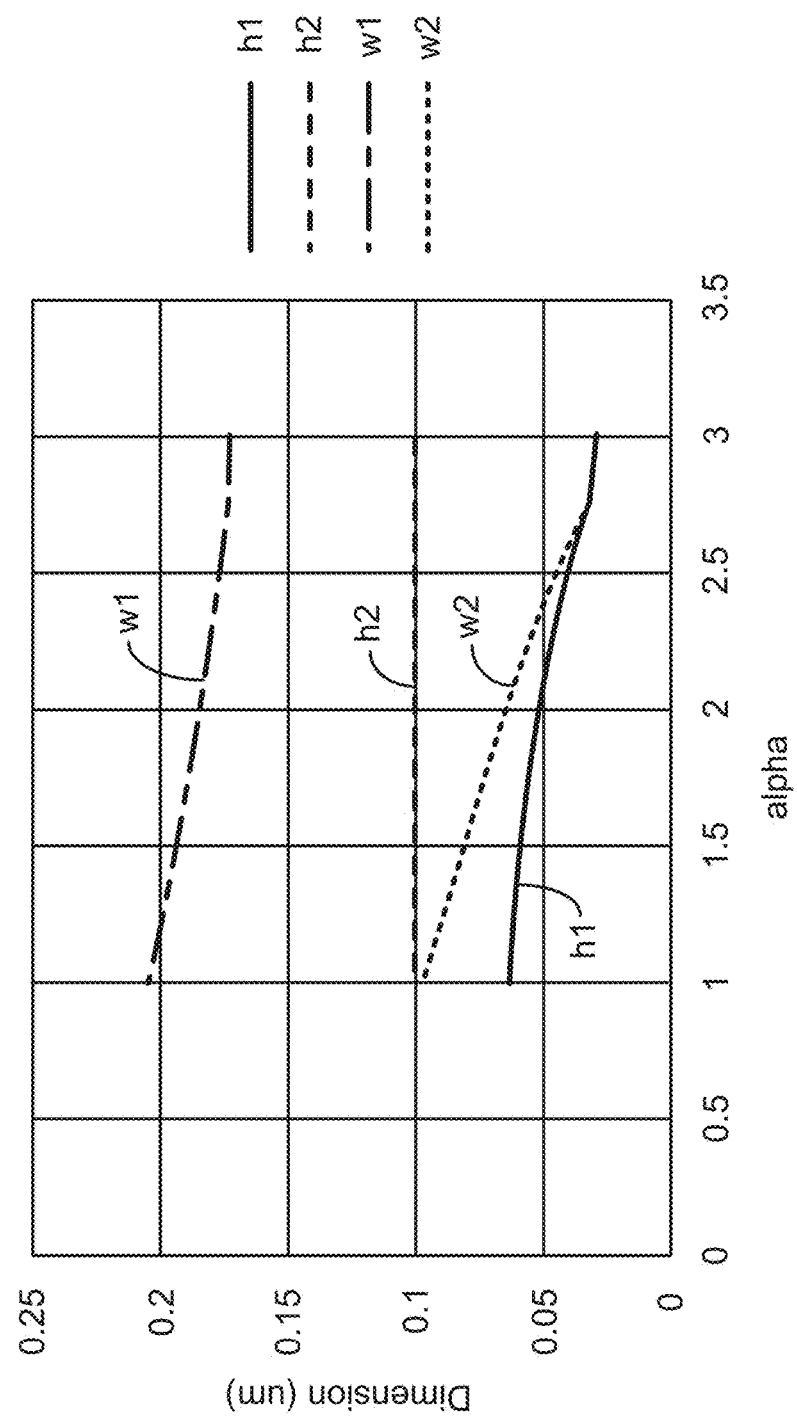
FIG. 17 shows the dependence of the grating parameters $h_1$, $h_2$, $w_1$, and $w_2$ on the optimization parameter $\alpha$ according to embodiments of the present invention.
Figure 18:
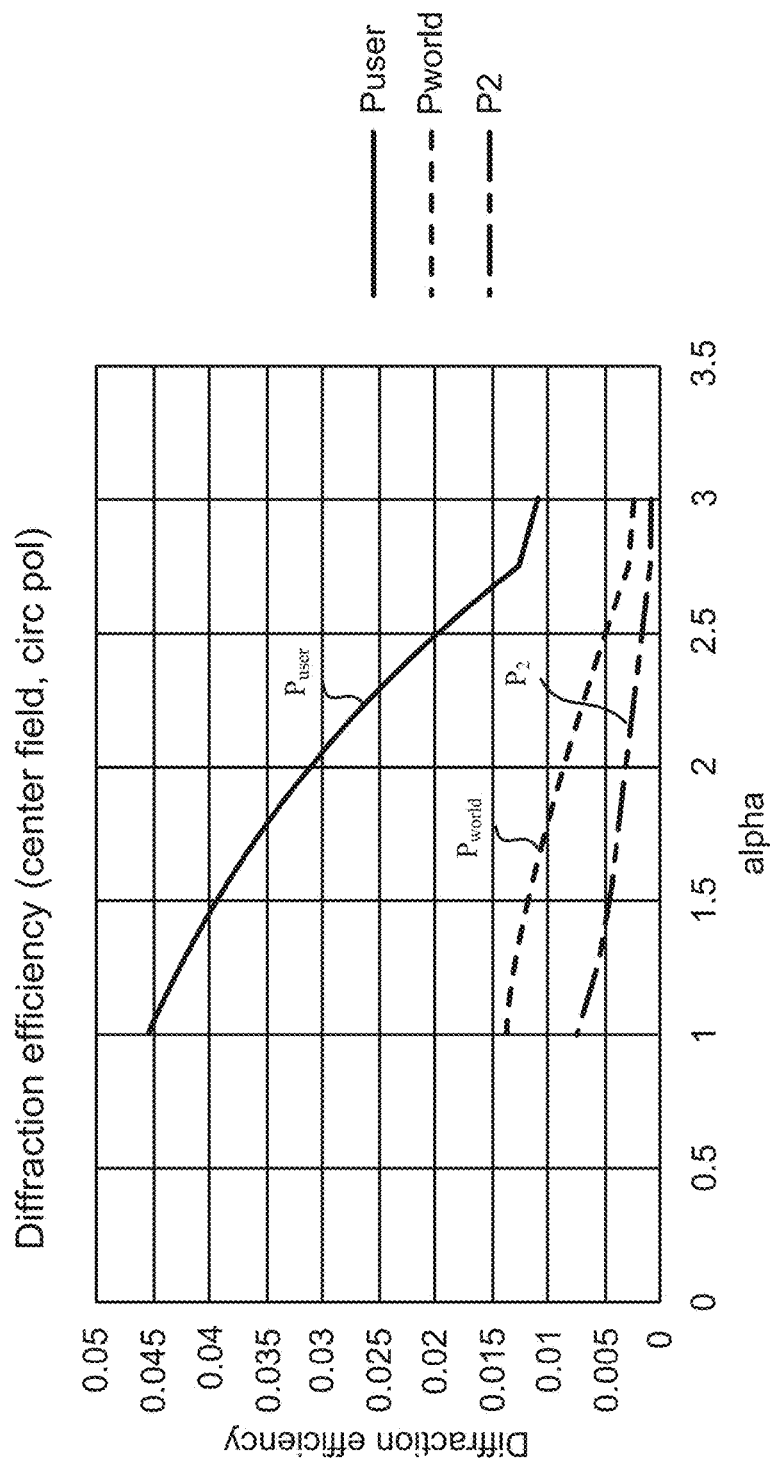
FIG. 18 shows the dependence of the power to the user ($P_{user}$), the power to the world ($P_{world}$), and the second order power ($P_2$) on the optimization parameter $\alpha$ according to embodiments of the present invention.

In some embodiments, optimization may be performed using a merit function as an objective of the optimization. Assume that the power that is diffracted toward the user is $P_{user}$, the power that is diffracted toward the world is $P_{world}$, the power in the second order is $P_2$, and the power in the zeroth order is $P_0$, as illustrated schematically in FIG. 16. In one embodiment, a merit function may be expressed as, $$J=\alpha(P_2+P_{world})-P_{user},$$

where $\alpha$ is weight given to the term $(P_2+P_{world})$ as compared to the term $P_{user}$. In one embodiment, $h_1$, $h_2$, $w_1$, and $w_2$ are allowed to vary in order to minimize the merit function J. Thus, the objectives of the optimization may be to minimize $P_2$ and $P_{world}$, and to maximize $P_{user}$. The parameter $\alpha$ determines the relative weight given to the two objectives. FIG. 17 shows the dependence of each of the variables $h_1$, $h_2$, $w_1$, and $w_2$ on the weight $\alpha$. FIG. 18 shows the dependence of $P_{user}$, $P_{world}$, and $P_2$ on the weight $\alpha$.

Figure 19:
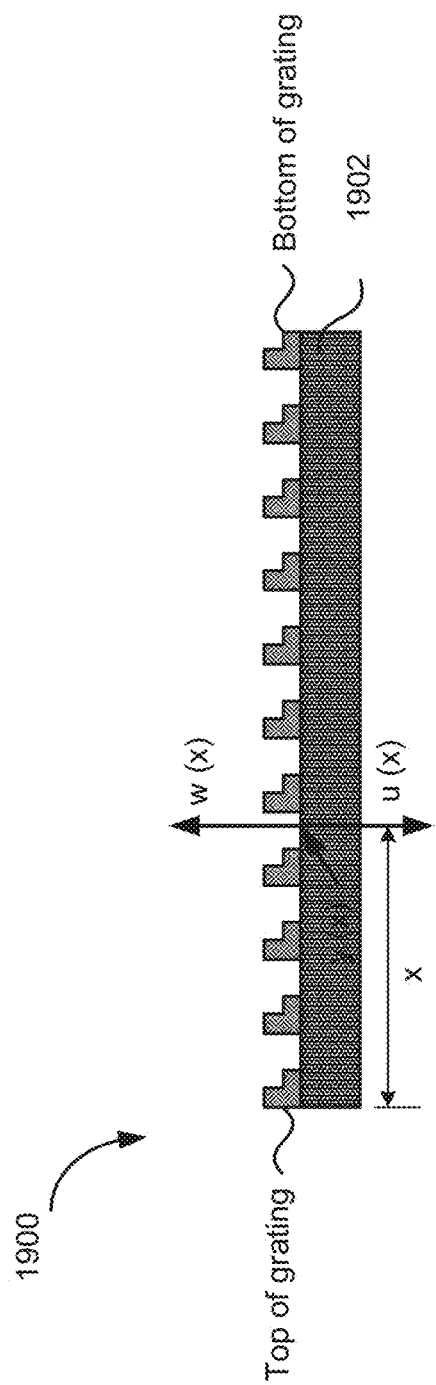
FIG. 19 shows a schematic cross-sectional view of a grating formed on a waveguide according to an embodiment of the present invention.

As discussed above, it may be advantageous to have a grating with a diffraction efficiency that increases as the distance from the top of the grating increases in order to achieve a relatively uniform light output from the grating across the EPE section of the eyepiece. FIG. 19 shows schematically a grating 1900 formed on a waveguide 1902. Let x be the normalized distance from the top of the grating (i.e., x=0 at the top of the grating, and x=1 at the bottom of the grating). Let f(x) be the normalized diffraction efficiency of the grating 1900 at position x. f(x) may be expressed as, $$f(x)=u(x)+w(x),$$

where u(x) and w(x) are the light going to the user (i.e., first order reflection 1R) and the light going to the world (i.e., first order transmission 1T), respectively. Note that f(x) denotes the efficiency of the grating 1900 for outcoupling light out of the grating 1900. Since the light in the second order reflection (2R) remains in the waveguide 1902, the second order reflection (2R) is not included in f(x). In some embodiments, f(x) may be normalized to a predetermined constant.

Let y(x) be the normalized light intensity within the waveguide 1902 at position x, and let y(0)=1. The outcoupled power (i.e., a dimensionless fraction of light outcoupled from the waveguide 1902) at position x may be expresses as, $$y'(x)=-f(x)y(x).$$

The solution to this differential equation may be expresses as, $$y(x)=e^{-\int_0^x f(z)dz}.$$

Using a simple linear model, we assume that the normalized diffraction efficiency f(x) can be expressed as, $$f(x)=a+bx,$$

where a and b are constants. The average outcoupled power by the grating 1900 may be expressed as, $$\int_0^1 f(x)y(x)dx.$$

The root-mean-square (RMS) deviation from the average outcoupled power may be expressed as, $$\int_0^1 [f(x)y(x)-\int_0^1 f(z)y(z)dz]^2 dx.$$

The RMS deviation represents the average deviation from the average outcoupled power. A lower value of RMS deviation would imply a higher uniformity of the outcoupled power as a function of x.

Figure 20A:
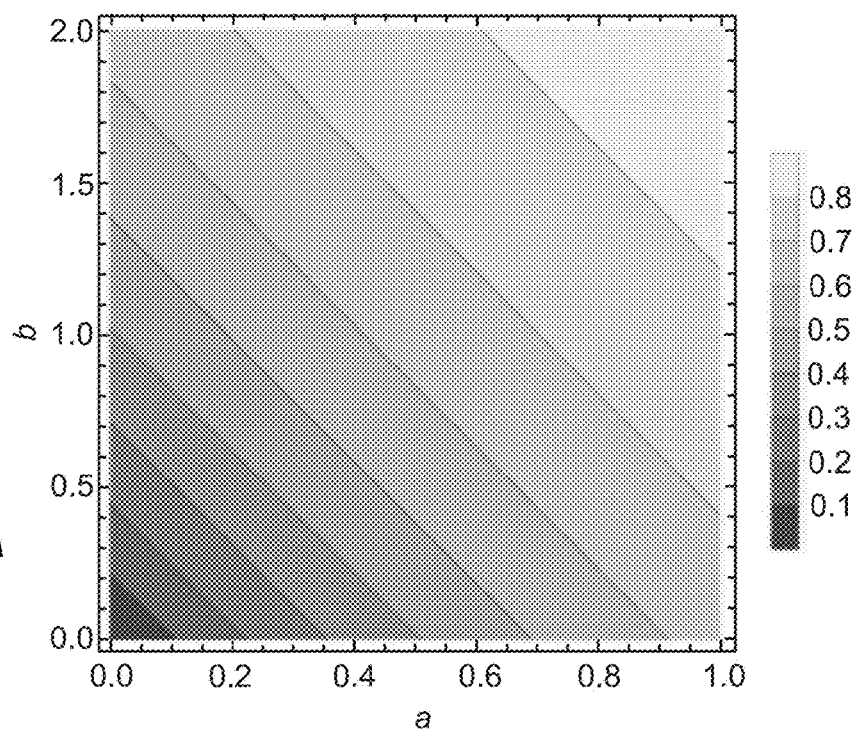
FIGS. 20A and 20B show a simulated contour plot of the average outcoupled power (FIG. 20A) and a simulated contour plot of the RMS deviation from the average outcoupled power (FIG. 20B), as a function of parameters a and b in a linear model of grating efficiency, according to an embodiment of the present invention.
Figure 20B:
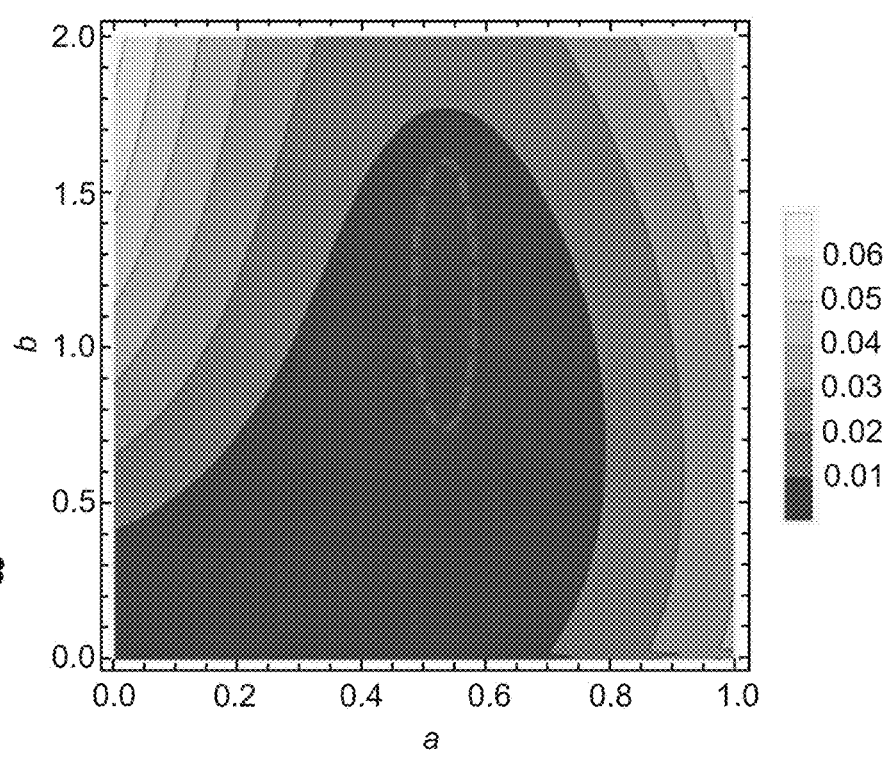

FIG. 20A shows a simulated contour plot of the average outcoupled power as a function of a and b. FIG. 20B shows a simulated contour plot of the RMS deviation from the average outcoupled power as a function of a and b. As illustrated from FIG. 20B, the area within the dashed ellipse may represent a parameter space of a and b that gives rise to relatively uniform outcoupled power across the grating. In some embodiments, a may be advantageously selected to be in a range from about 0.5 to 0.7, and b may be advantageously selected to be in a range from about 1.0 to about 1.5.

As an example, let's assume a=0.5 and b=1.0, thus f(x)=0.5+x. Assume that light bounces N times in the waveguide 1902 from the top to the bottom. The initial outcoupling rate of the grating 1900 (i.e., at x=0) may be 0.5/N, assuming that f(x) is normalized to 1/N. The final outcoupling rate of the grating 1900 after N bounces (i.e., at x=1) may be 1.5/N. As an example, assume that the waveguide 1902 has a thickness of about 325 μm. For a 50 degrees angle of incidence, the bouncing spacing may be about 0.77 mm. Assume that the total width of the grating 1900 from the top to the bottom is L=21 mm. Thus, light may bounce 27 times from the top of the waveguide 1902 to the bottom of the waveguide 1902. The initial outcoupling efficiency of the grating 1900 (toward the user and the world) at the top of the grating may be about 1.8%, and the final outcoupling efficiency of the grating 1900 (toward the user and the world) at the bottom of the grating may be about 5.4%.

Figure 21:
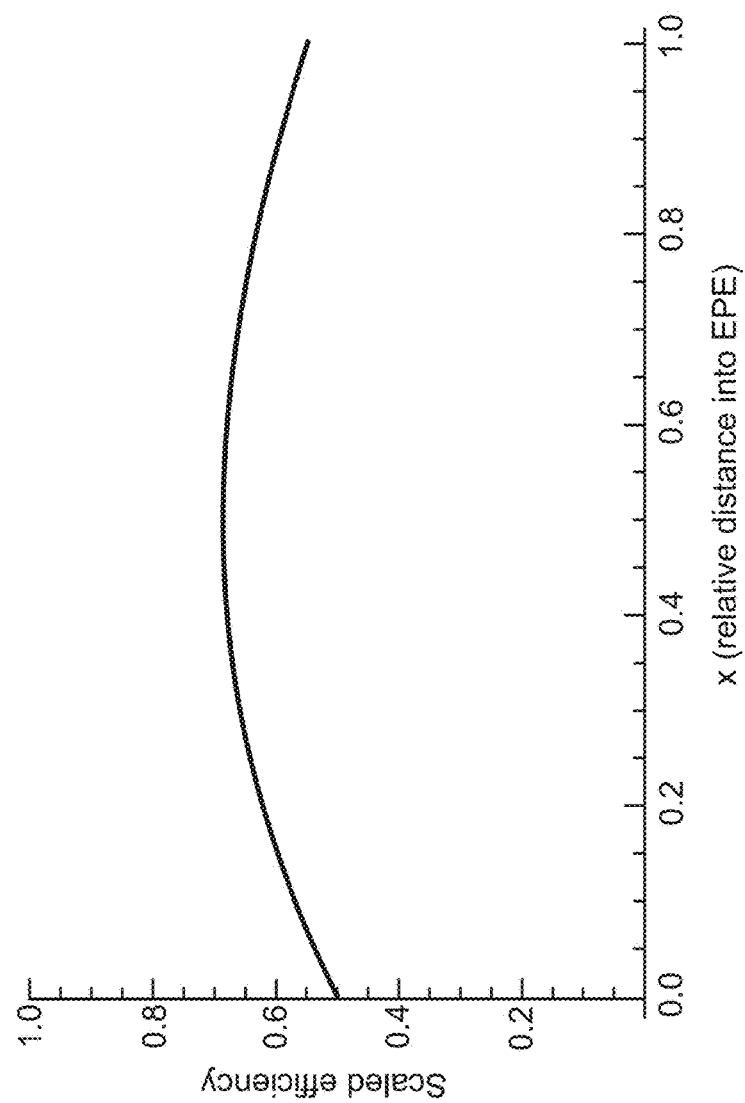
FIG. 21 shows a simulated plot of normalized outcoupled power g(x)=f(x)y(x) (toward the user and the world) as a function of normalized distance x from the top of the grating, for a linear model with parameters a=0.5 and b=1, according to an embodiment of the present invention.

FIG. 21 shows a plot of normalized outcoupled power g(x)=f(x) y(x) (toward the user and the world) as a function of normalized distance x from the top of the grating 1900, for a linear model with a=0.5 and b=1, according to an embodiment of the present invention. As illustrated, the normalized outcoupled power is relatively uniform across the grating 1900.

In general, for a more uniform outcoupling power across the grating, the diffraction efficiency of the grating may vary from top to bottom by a factor ranging from about 2× to about 3λ. Higher factors may result in more light output, but may result in less uniformity. The highest achievable diffraction efficiency at the bottom of the grating may determine the total outcoupling efficiency. The above may be true for a grating in which the user-side diffraction efficiency (i.e., 1R) and the world-side diffraction efficiency (i.e., 1T) are approximately proportional to each other. This may not be the case for deep gratings.

It should be understood that, although a grating with its diffraction efficiency varied linearly as a function of position is discussed above, this is not required and other variation patterns are possible. According to some other embodiments, gratings may be designed with their diffraction efficiencies varied as a quadratic function or other non-linear functions. In some other embodiments, gratings may be designed with their diffraction efficiencies varied non-monotonically from one edge of the grating to another. For example, for an eyepiece with a bowtie topology as illustrated in FIG. 3 where light is injected into the waveguide at a middle section thereof, a grating may be designed such that its diffraction efficiencies are lower in the middle section of the grating and higher on the two edges of the grating on either side of the middle section.

Optimization may be performed for a three-level grating whose diffraction efficiency increases as the distance from the top of the grating increases. FIGS. 22A and 22B show schematic cross-sectional views of one period of a three-level grating at the top of the grating (FIG. 22A) and at the bottom of the grating (FIG. 22B) according to some embodiments of the present invention. The first height $h_1$ of each first ridge and the second height $h_2$ of each second ridge are fixed at $h_1$=50 nm and $h_2$=75 nm. In some embodiments, the value of each of $w_1$ and $w_2$ may increase as the distance from the top of the grating increases. For example, the first width $w_1$ of a first ridge at the top of the grating may have a value of $w_1$=180 nm, and the first width $w_1$ of a first ridge at the bottom of the grating may have a value of $w_1$=220 nm; the second width $w_2$ of a second ridge at the top of the grating may have a value of $w_2$=60 nm, and the second width $w_2$ of a second ridge at the bottom of the grating may a value of $w_2$=180 nm, as illustrated in FIGS. 22A and 22B. In some other embodiments, the ratio of the first width and the second width $w_1/w_2$ may increase as the distance from the top of the grating increases. As discussed above, the first width $w_1$, the second width $w_2$, and/or the ratio $w_1/w_2$ may vary across the grating in other manners. For example, the ratio $w_1/w_2$ may be lower in a middle section of the grating and higher toward both edges of the grating.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An eyepiece for projecting an image to an eye of a viewer, the eyepiece comprising:
   a waveguide having a surface and configured to propagate light therein; and
   a diffractive optical element optically coupled to the waveguide, the diffractive optical element including:
   a plurality of first ridges protruding from the surface of the waveguide and arranged as a periodic array having a period, each of the plurality of first ridges having a first height in a direction perpendicular to the surface of the waveguide and a first width in a direction of the period; and a plurality of second ridges, each of the plurality of second ridges protruding from a respective first ridge and having a second height greater than the first height and a second width less than the first width;

wherein the diffractive optical element is configured to diffract a first portion of the light propagating in the waveguide toward the eye as a first order reflection, and to diffract a second portion of the light propagating in the waveguide away from the eye as a first order transmission.

2. The eyepiece of claim 1 wherein the first width ranges from 0.4 times the period to 0.6 times the period.

3. The eyepiece of claim 1 wherein the second width is less than 0.25 times the period.

4. The eyepiece of claim 1 wherein a ratio of the second height and the first height ranges from 8:7 to 8:3.

5. The eyepiece of claim 1 wherein the first width and the second width are selected such that the diffractive optical element has a first order reflection efficiency greater than a first order transmission efficiency.

6. The eyepiece of claim 5 wherein a ratio of the first order reflection efficiency and the first order transmission efficiency is greater than 2.

7. The eyepiece of claim 1 wherein the diffractive optical element is configured to diffract a third portion of the light propagating in the waveguide in a direction substantially opposite to a direction of incidence as a second order reflection, and the first width and the second width are selected such that the diffractive optical element has a second order reflection efficiency less than one percent.

8. An eyepiece for projecting an image to an eye of a viewer, the eyepiece comprising:

a waveguide having a surface and configured to propagate light therein; and a diffractive optical element optically coupled to the waveguide, the diffractive optical element including:

a plurality of first ridges protruding from the surface of the waveguide and arranged as a periodic array having a period, each respective first ridge having a respective first width in a direction of the period that varies as a function of a position of the respective first ridge in the direction of the period; and a plurality of second ridges, each respective second ridge protruding from a corresponding first ridge and having a respective second width that is less than a corresponding first width of the corresponding first ridge, each respective second width varying as a function of the position of the corresponding first ridge in the direction of the period;

wherein the diffractive optical element is configured to diffract a first portion of the light propagating in the waveguide toward the eye as a first order reflection, and to diffract a second portion of the light propagating in the waveguide away from the eye as a first order transmission.

9. The eyepiece of claim 8 wherein each first ridge has a first height, and each second ridge has a second height greater than the first height.

10. The eyepiece of claim 9 wherein the first height ranges from 45 nm to 65 nm, and the second height ranges from 70 nm to 80 nm.

11. The eyepiece of claim 8 wherein each respective first width of the respective first ridge and each respective second width of the respective second ridge are varied such that a first order reflection efficiency of the diffractive optical element varies as a function of a position across the surface of the waveguide in the direction of the period.

12. The eyepiece of claim 11 wherein the first order reflection efficiency of the diffractive optical element increases from a first edge of the diffractive optical element to a second edge of the diffractive optical element.

13. The eyepiece of claim 12 wherein the first order reflection efficiency of the diffractive optical element increases substantially linearly from the first edge of the diffractive optical element to the second edge of the diffractive optical element.

14. The eyepiece of claim 11 wherein the first order reflection efficiency of the diffractive optical element increases from a center portion of the diffractive optical element toward an edge of the diffractive optical element on either side of the center portion.

15. An eyepiece for projecting an image to an eye of a viewer, the eyepiece comprising:

a waveguide having a surface and configured to propagate light therein; and a diffractive optical element optically coupled to the waveguide, the diffractive optical element including:

a plurality of first ridges protruding from the surface of the waveguide and arranged as a periodic array having a period, each respective first ridge having a respective first width in a direction of the period; and a plurality of second ridges, each respective second ridge protruding from a corresponding first ridge and having a respective second width that is less than a corresponding first width of the corresponding first ridge;

wherein a ratio of the respective second width of the respective second ridge to the corresponding first width of the corresponding first ridge varies as a function of a position of the corresponding first ridge in the direction of the period, and wherein the diffractive optical element is configured to diffract a first portion of the light propagating in the waveguide toward the eye as a first order reflection, and to diffract a second portion of the light propagating in the waveguide away from the eye as a first order transmission.

16. The eyepiece of claim 15 wherein the ratio of the respective second width of the respective second ridge to the corresponding first width of the corresponding first ridge varies as the function of the position of the corresponding first ridge in the direction of the period such that a first order reflection efficiency of the diffractive optical element varies as a function of a position across the surface of the waveguide in the direction of the period.

17. The eyepiece of claim 16 wherein the first order reflection efficiency of the diffractive optical element increases from a first edge of the diffractive optical element to a second edge of the diffractive optical element.

18. The eyepiece of claim 17 wherein the first order reflection efficiency of the diffractive optical element increases substantially linearly from the first edge of the diffractive optical element to the second edge of the diffractive optical element.

19. The eyepiece of claim 16 the first order reflection efficiency of the diffractive optical element increases from a center portion of the diffractive optical element toward an edge of the diffractive optical element on either side of the center portion.

20. The eyepiece of claim 15 wherein each first ridge has a first height, and each second ridge has a second height greater than the first height.

* * * * *